(12) United States Patent
Mori et al.

(10) Patent No.: US 7,264,077 B2
(45) Date of Patent: Sep. 4, 2007

(54) DRIVE FORCE CONTROL METHOD FOR FOUR-WHEEL DRIVE VEHICLE

(75) Inventors: Atsushi Mori, Wako (JP); Yasuji Shibahata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 11/093,151

(22) Filed: Mar. 30, 2005

(65) Prior Publication Data

US 2005/0217921 A1 Oct. 6, 2005

(30) Foreign Application Priority Data

Mar. 31, 2004 (JP) ............................. 2004-105023

(51) Int. Cl.
*B60K 17/34* (2006.01)
*B60K 28/16* (2006.01)

(52) U.S. Cl. ...................... 180/233; 180/197; 180/248; 701/69

(58) Field of Classification Search ................ 180/197, 180/233, 248; 701/69–72, 80–90
See application file for complete search history.

(56) References Cited

U.S. PATENT DOCUMENTS 4,986,388 A * 1/1991 Matsuda ..................... 180/248
5,183,131 A * 2/1993 Naito .......................... 180/233
5,225,984 A * 7/1993 Nakayama ................... 701/36
5,701,247 A * 12/1997 Sasaki ............................ 701/1
6,131,054 A * 10/2000 Shibahata ....................... 701/1

FOREIGN PATENT DOCUMENTS

| JP | 1-182128 | 7/1989 |
|----|----------|--------|
| JP | 1-233124 | 9/1989 |

* cited by examiner

*Primary Examiner*—Lesley D. Morris
*Assistant Examiner*—Marc A. Scharich
(74) *Attorney, Agent, or Firm*—Westerman, Hattori, Daniels & Adrian, LLP.

(57) ABSTRACT

A drive force control method for a four-wheel drive vehicle including a torque distributing mechanism capable of changing a drive force distribution ratio between front and rear wheels and a drive force distribution ratio between right and left front wheels or between right and left rear wheels. This method includes the steps of increasing the drive force distribution ratio of the rear wheels to the front wheels according to an increase in absolute value of a lateral G signal, and increasing the drive force distribution ratio of a turning outer wheel as one of the right and left front wheels or one of the right and left rear wheels to a turning inner wheel as the other. A lateral G sensor signal is corrected by an estimated lateral G signal calculated according to a steering angle and a vehicle speed to obtain a control lateral G signal, which is used as the lateral G signal.

4 Claims, 22 Drawing Sheets

DRIVE FORCE CONTROL METHOD FOR FOUR-WHEEL DRIVE VEHICLE

BACKGROUND OF THE INVENTION

1. Field of the Invention

The present invention relates to a drive force control method for a four-wheel drive vehicle.

2. Description of the Related Art

In the case of turning a corner having a small turning radius in a four-wheel drive mode of a four-wheel drive vehicle in a low to medium vehicle speed range, a difference in rotational speed due to a difference in turning radius is generated between the front and rear wheels of the vehicle, causing a tight corner braking phenomenon. As the prior art for eliminating such a tight corner braking phenomenon, front and rear wheels driving devices are disclosed in Japanese Patent Publication Nos. 7-61779 and 7-64219.

The front and rear wheels driving devices disclosed in these publications have such a structure that a speed increasing device is provided between main drive wheels and auxiliary drive wheels to thereby adjust an average rotational speed of the auxiliary drive wheels to an average rotational speed of the main drive wheels. This speed increasing device includes a lockup clutch and a speed increasing clutch, which are selectively switched between ON and OFF states to thereby obtain a lockup condition where the average rotational speed of the main drive wheels and the average rotational speed of the auxiliary drive wheels are substantially equal to each other or a speed increase condition where the average rotational speed of the auxiliary drive wheels is greater than the average rotational speed of the main drive wheels.

Particularly in the front and rear wheels driving device disclosed in Japanese Patent Publication No. 7-61779, a torque distribution ratio between right and left rear wheels are controlled according to a vehicle speed and a steering angle so that the rear wheel torque is larger than the front wheel torque and the turning outer wheel torque is larger than the turning inner wheel torque. In this front and rear wheels driving device, the auxiliary drive wheels are increased in rotational speed by the speed increasing device in turning a corner having a small turning radius in the four-wheel drive mode, thereby preventing the tight corner braking phenomenon.

When the vehicle is accelerated during turning, the vertical loads on the inner wheels and the front wheels are reduced by the influence of lateral and longitudinal accelerations acting on the vehicle body. Further, since the front wheels are steered for turning, a lateral force acting on the front wheels is greater than that acting on the rear wheels. The greater the vertical load, the greater the drive force that can be generated by each tire. Therefore, the load on the tire of each front wheel is greater than the load on the tire of each rear wheel during turning at acceleration, and the load on the tire of each inner wheel is greater than the load on the tire of each outer wheel during turning at acceleration. The load on each tire depends on the degree of turning (the magnitude of lateral G) and the magnitude of acceleration.

It is effective to make the load on each tire uniform in improving the acceleration performance during turning. However, no mention as to making uniform the vertical load on each tire, or the load on each tire is made in the above publications, and minute drive force control is not disclosed in these publications. For example, a conventional drive force control method for the above front and rear wheels driving device has a problem such that the actual behavior of the vehicle body cannot be sufficiently grasped according to a road condition.

SUMMARY OF THE INVENTION

It is therefore an object of the present invention to provide a drive force control method for a four-wheel drive vehicle which can accurately control a drive force distribution ratio between front and rear wheels and a drive force distribution ratio between right and left front wheels or between right and left rear wheels.

In accordance with an aspect of the present invention, there is provided a drive force control method for a four-wheel drive vehicle including a torque distributing mechanism capable of changing a drive force distribution ratio between front and rear wheels and a drive force distribution ratio between right and left front wheels or between right and left rear wheels, the drive force control method including the steps of detecting a lateral G to output a lateral G signal; increasing the drive force distribution ratio of the rear wheels to the front wheels according to an increase in absolute value of the lateral G signal; and increasing the drive force distribution ratio of a turning outer wheel as one of the right and left front wheels or one of the right and left rear wheels to a turning inner wheel as the other according to an increase in absolute value of the lateral G signal.

According to this constitution, the drive force distribution ratio of the rear wheels to the front wheels is increased with an increase in absolute value of the lateral G signal, and the drive force distribution ratio of the turning outer wheel to the turning inner wheel is increased with an increase in absolute value of the lateral G signal. Accordingly, the load on each tire can be made uniform, and understeer occurring during turning at acceleration can be suppressed to obtain stable acceleration. The use of an output signal from a lateral G sensor as the lateral G signal is most general. However, it is known that the output from the lateral G sensor delays from a turning operation by the operator. Further, an actuator for performing the torque distribution generally has delay characteristics. Accordingly, if only the output signal from the lateral G sensor is used, control delay occurs.

Preferably, a lateral G sensor signal output from a lateral G sensor is used as the lateral G signal, and the drive force control method further includes the steps of calculating an estimated lateral G according to a steering angle and a vehicle speed, and correcting the lateral G sensor signal by the estimated lateral G.

Since the estimated lateral G is calculated according to a steering angle and a vehicle speed, and the lateral G sensor signal is corrected by the estimated lateral G, control delay can be eliminated. In other words, since the steering angle is a turning operation itself by the operator, the estimated lateral G signal can be obtained earlier than the output signal from the lateral G sensor. As a result, a control command can be early output to thereby allow quick-response control.

Thus, quick-response control can be performed by using the estimated lateral G signal. However, unless feedback control is adopted, high-precision control cannot always be performed. If the control accuracy is lowered to cause an excess control amount, the drive force distribution ratio of the rear wheels to the front wheels is unduly increased and the drive force distribution ratio of the turning outer wheel to the turning inner wheel is also unduly increased. As a result, oversteer occurs to cause a possibility that the behavior of the vehicle may become unstable.

In accordance with another aspect of the present invention, the drive force control method further includes the steps of detecting an unstable condition of the vehicle, and increasing the drive force distribution ratio of the front wheels to the rear wheels and decreasing the drive force distribution ratio of the turning outer wheel to the turning inner wheel when the unstable condition of the vehicle is detected.

According to this constitution, since the unstable condition of the vehicle is detected, and the drive force distribution ratio of the front wheels to the rear wheels is so corrected as to be increased and the drive force distribution ratio of the turning outer wheel to the turning inner wheel is so corrected as to be decreased when the unstable condition of the vehicle is detected, the unstable condition of the behavior of the vehicle can be eliminated.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
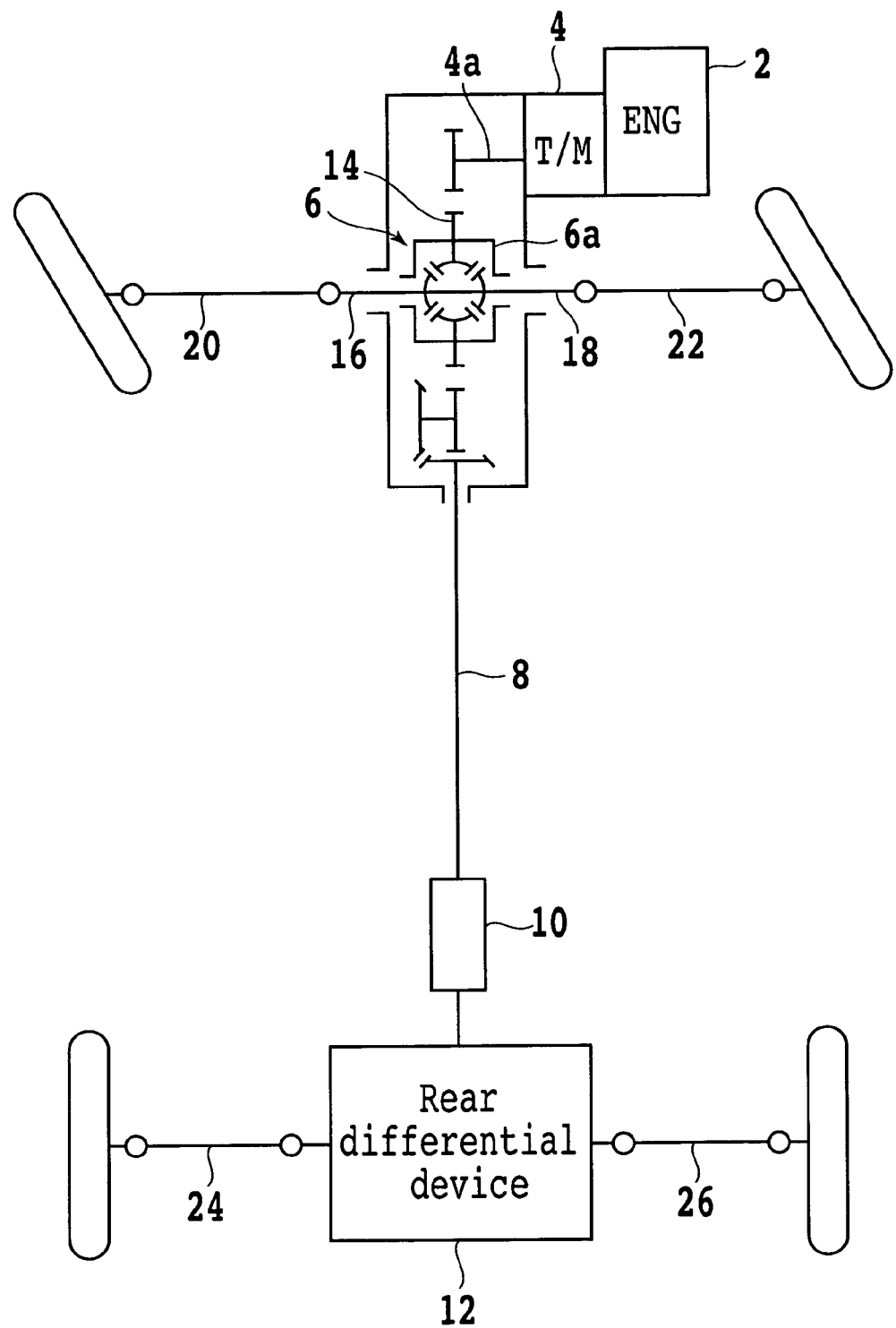
FIG. 1 is a schematic diagram showing a power transmitting system for a four-wheel drive vehicle to which the drive force control method of the present invention is applicable.

Referring to FIG. 1, there is shown a schematic diagram of a power transmitting system for a four-wheel drive vehicle having a speed increasing device (speed changing device) 10 based on a front-engine front-drive (FF) vehicle. As shown in FIG. 1, the power transmitting system for the four-wheel drive vehicle mainly includes a front differential device 6 to which the power of an engine 2 located at a front portion of the vehicle is transmitted from an output shaft 4a of a transmission 4, a speed increasing device (speed changing device) 10 to which the power from the front differential device 6 is transmitted through a propeller shaft 8, and a rear differential device 12 to which the power from the speed increasing device 10 is transmitted.

The front differential device 6 has a structure well known in the art, and the power from the output shaft 4a of the transmission 4 is transmitted through a plurality of gears 14 and output shafts 16 and 18 in a differential case 6a to left and right front wheel drive shafts 20 and 22, thereby driving front wheels. As will be hereinafter described, the rear differential device 12 includes a pair of planetary gear sets and a pair of electromagnetic actuators for controlling the engagement of multiplate clutch mechanisms. The electromagnetic actuators are controlled to transmit the power to left and right rear wheel drive shafts 24 and 26, thereby driving rear wheels.

Figure 2:
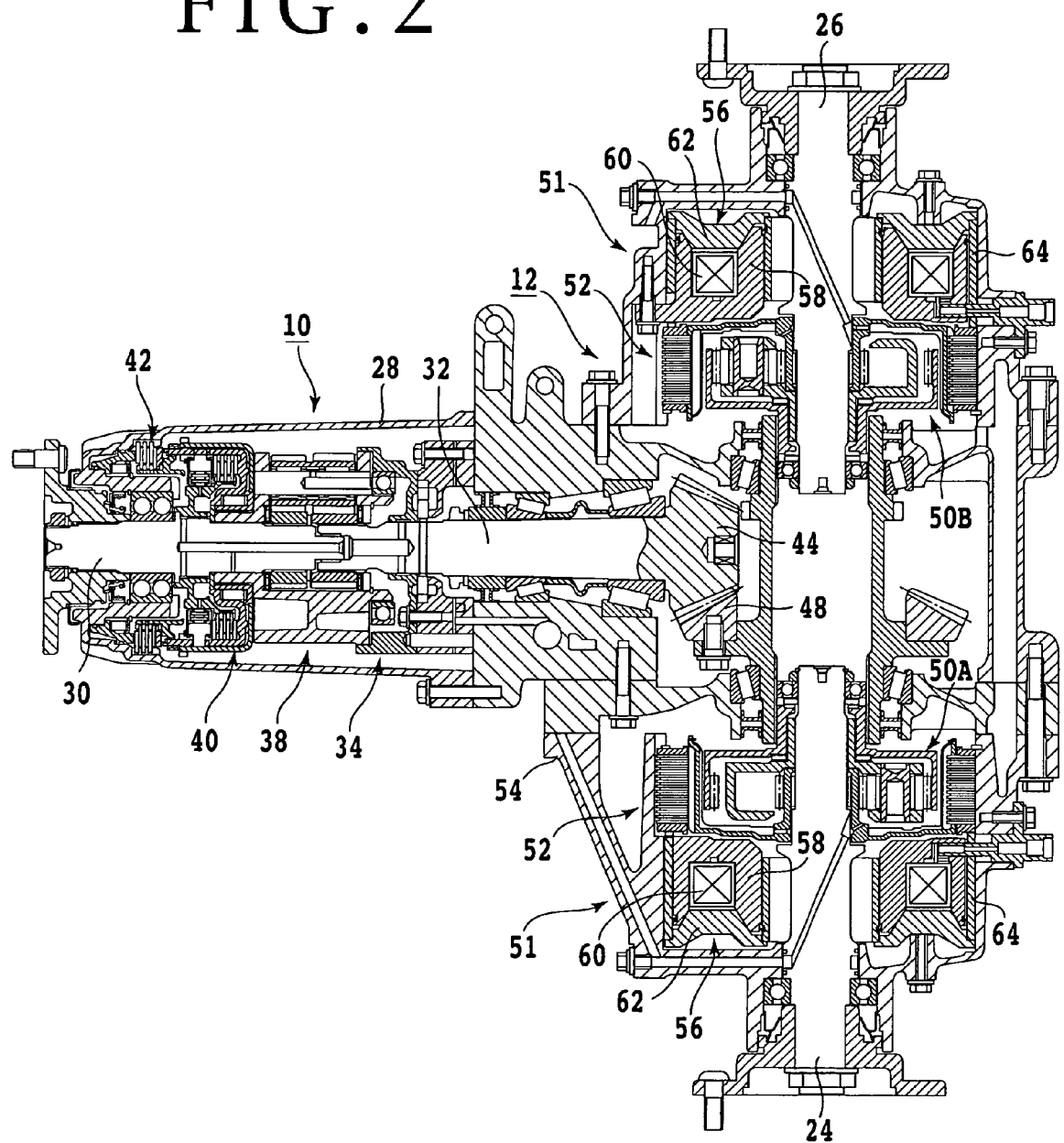
FIG. 2 is a sectional view of a speed increasing device (speed changing device) and a rear differential device.

FIG. 2 is a sectional view of the speed increasing device 10 and the rear differential device 12 located downstream of the speed increasing device 10. The speed increasing device 10 includes an input shaft 30 rotatably mounted in a casing 28 and an output shaft (hypoid pinion shaft) 32. The speed increasing device 10 further includes an oil pump subassembly 34, a planetary carrier subassembly 38, a lockup clutch 40, and a speed increasing clutch (speed increasing brake) 42.

When the lockup clutch 40 is engaged, the rotation of the input shaft 30 is directly transmitted to the output shaft 32 without changes in rotational speed. On the other hand, when the lockup clutch 40 is disengaged and the speed increasing clutch 42 is engaged, the rotation of the input shaft 30 is transmitted to the output shaft 32 with the rotational speed being increased by a predetermined amount. A detailed structure of the speed increasing device 10 is disclosed in Japanese Patent Application NO. 2002-278836 previously filed by the present applicant. The rear differential device 12 located downstream of the speed increasing device 10 has a hypoid pinion gear 44 formed at the rear end of the hypoid pinion shaft 32. The hypoid pinion gear 44 is in mesh with a hypoid ring gear 48, and the power from the hypoid ring gear 48 is input to the ring gears of a pair of left and right planetary gear sets 50A and 50B.

The sun gears of the planetary gear sets 50A and 50B are rotatably mounted on a left rear axle 24 and a right rear axle 26, respectively. The planetary carriers of the planetary gear sets 50A and 50B are fixed to the left rear axle 24 and the right rear axle 26, respectively. In each of the planetary gear sets 50A and 50B, the planetary gear carried by the planetary carrier is in mesh with the sun gear and the ring gear. The left and right planetary gear sets 50A and 50B are connected to a pair of left and right clutch mechanism (brake mechanisms) 51 provided to variably control the torque of the respective sun gears. Each clutch mechanism 51 includes a wet multiplate clutch (brake) 52 and an electromagnetic actuator 56 for operating the multiplate clutch 52.

The clutch plates of each wet multiplate clutch 52 are fixed to a casing 54, and the clutch discs of each wet multiplate clutch 52 are fixed to the sun gear of each of the planetary gear sets 50A and 50B. Each electromagnetic actuator 56 is composed of a core (yoke) 58, an exciting coil 60 inserted in the core 58, an armature 62, and a piston 64 connected to the armature 62. When a current is passed through the exciting coil 60, the armature 62 is attracted to the core 58 by the coil 60 to thereby generate a thrust. Accordingly, the piston 64 integrally connected to the armature 62 pushes the multiplate clutch 52 to thereby generate a clutch torque.

Accordingly, the sun gears of the planetary gear sets 50A and 50B are fixed to the casing 54, and the drive force of the hypoid pinion shaft 32 is transmitted through the ring gears, the planet gears, and the planetary carriers of the planetary gear sets 50A and 50B to the left and right rear axles 24 and 26. By making variable the currents to be passed through the left and right exciting coils 60, the output torques to the left and right rear axles 24 and 26 can be variably controlled.

When the lockup clutch 40 of the speed increasing device 10 is engaged and the left and right exciting coils 60 of the rear differential device 12 are off, the left and right clutch mechanisms 51 are disengaged and the sun gears of the planetary gear sets 50A and 50B therefore idly rotate about the left and right rear axles 24 and 26. Accordingly, the drive force (torque) of the hypoid pinion shaft 32 is not transmitted to the left and right rear axles 24 and 26. In this case, the rear wheels idly rotate and the drive force from the engine is fully transmitted to the front wheels, so that this four-wheel drive vehicle runs in a two-wheel drive mode.

When predetermined amounts of currents are passed through the left and right exciting coils 60 to completely engage the left and right multiplate clutches 52 through the pistons 64, the sun gears of the planetary gear sets 50A and 50B are fixed to the casing 54. Accordingly, the drive force of the input shaft 30 is uniformly divided by the planetary gear sets 50A and 50B and transmitted to the left and right rear axles 24 and 26. As a result, this four-wheel drive vehicle runs in a four-wheel drive mode.

In the case of turning a corner having a small turning radius in the four-wheel drive mode in a medium vehicle speed range, the lockup clutch 40 is disengaged and the speed increasing clutch 42 is engaged. Accordingly, the rotational speed of the output shaft 32 is increased over that of the input shaft 30. The speed increasing rate is about 5%, for example. In such a case that the vehicle is turned in the condition where the rotational speed of the output shaft 32 is increased over that of the input shaft 30, the rear wheel on the turning outside can be rotated faster than the front wheel on the same side, so that the drive force can be transmitted to the rear wheel on the turning outside, and the turning performance in the medium vehicle speed range can be improved.

The loci of the front wheels and the rear wheels during turning of the vehicle will now be described with reference to FIG. 3. Reference numeral 66 denotes the center of turning, reference numerals 68L and 68R denote the left and right front wheels, respectively, and reference numerals 70L and 70R denote the left and right rear wheels, respectively. It is assumed that the vehicle is turned counterclockwise about the center 66. Reference numeral 72 denotes the locus of the front inner wheel 68L, reference numeral 74 denotes the locus of the front outer wheel 68R, and reference numeral 76 denotes the average locus of the front wheels. Reference numeral 78 denotes the average locus of the rear wheels in the engaged condition of the lockup clutch 40, and reference numeral 80 denotes the locus of the rear outer wheel 70R in the engaged condition of the lockup clutch 40.

Figure 3:
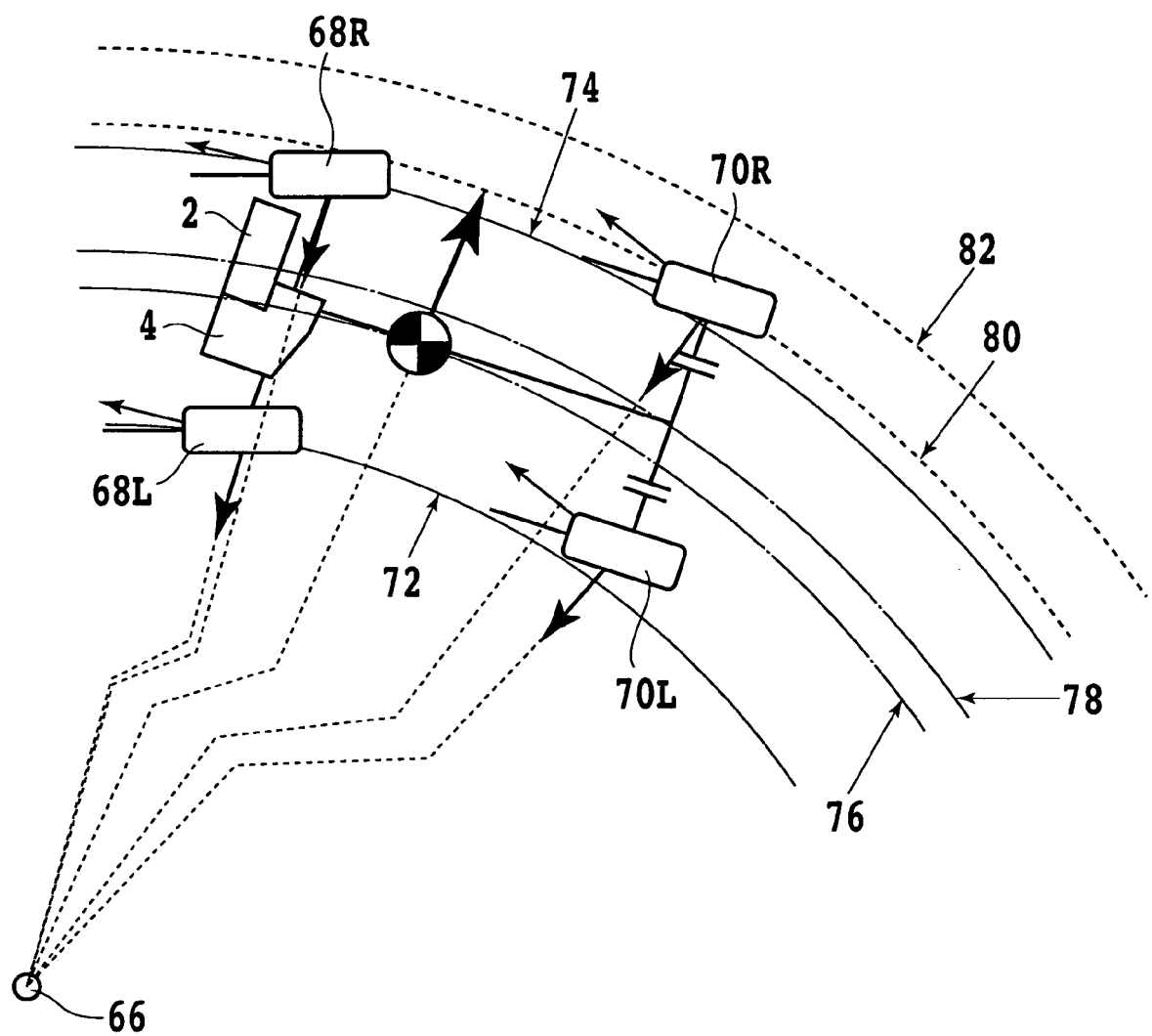
FIG. 3 is a diagram showing the locus of each wheel during turning of the vehicle.

In the case of turning at high lateral G as shown in FIG. 3, the slip angle of the rear wheels becomes larger (the cornering force becomes larger), so that the locus 80 of the rear outer wheel 70R is larger in radius than the average locus of the rear wheels 78 in the engaged condition of the lockup clutch 40, and the drive force (torque) is not transmitted to the rear outer wheel 70R. In the four-wheel drive vehicle according to the present invention, the speed increasing clutch 42 of the speed increasing device 10 is engaged in this case, thereby increasing the rotational speed of the output shaft 32 by about 5% over the rotational speed of the input shaft 30. Accordingly, the drive force (torque) can be transmitted to the rear outer wheel 70R. Reference numeral 82 denotes the locus of the rear outer wheel 70R in the engaged condition of the speed increasing clutch 42.

Operation modes of the drive force control method according to the present invention are shown in Tables 1A and 1B.

TABLE 1A

| | | Mode Forward | | | | | | | |
|---|---|---|---|---|---|---|---|---|---|
| | | Straight | | Straight (LSD) | | Left turn (lockup) | | Left turn (speed increase) | |
| | Element | Acceleration | Deceleration | Acceleration | Deceleration | Acceleration | Deceleration | Acceleration | Deceleration |
| 1 | Speed increasing clutch | — | — | — | — | — | — | on | on |
| 2 | Lockup clutch | on | on | on | on | on | on | — | — |
| 3 | Left clutch | Medium | Small | Large | Small | Small | Small | Small | Small |
| 4 | Right clutch | Medium | Small | Large | Small | Large | Small | Large | Small |

TABLE 1B

| | | Mode Reverse | | | |
|---|---|---|---|---|---|
| | | Straight | | Straight (LSD) | |
| | Element | Acceleration | Deceleration | Acceleration | Deceleration |
| 1 | Speed increasing clutch | — | — | — | — |
| 2 | Lockup clutch | on | on | on | on |
| 3 | Left clutch | Medium | Small | Large | Small |
| 4 | Right clutch | Medium | Small | Large | Small |

In the case of right turn, the magnitudes in the element (3) and the magnitudes in the element (4) are changed.

Conditions for turning (lockup):

The vehicle speed is less than 30 km/h or greater than 120 km/h.

The lateral G is less than 0.075 G. Conditions for turning (speed increase):

The vehicle speed is 30 to 120 km/h, and the lateral G is not less than 0.075 G.

Small: 0 to 40 kgfm Medium: 40 to 80 kgfm Large: 80 to 110 kgfm

In Tables 1A and 1B, "Small", "Medium", and "Large" indicate the magnitudes of the engaging force of each clutch. "Small" means 0 to 40 kgfm, "Medium" means 40 to 80 kgfm, and "Large" means 80 to 110 kgfm. In the case that the vehicle speed is less than 30 km/h or greater than 120 km/h during turning, the lockup clutch 40 is engaged. Further, also in the case that the lateral G is less than 0.075 G, the lockup clutch 40 is engaged.

In the case that the vehicle speed is 30 to 120 km/h and the lateral G is not less than 0.075 G during turning, the speed increasing clutch 42 is engaged, so that torque transmission to the rear outer wheel is allowed. While the engaging forces of the left and right clutches 52 during left turning are shown in Table 1, the magnitudes of the engaging force of the left clutch 52 may be interchanged with the magnitudes of the engaging force of the right clutch 52 in the case of right turning.

Figure 4A:
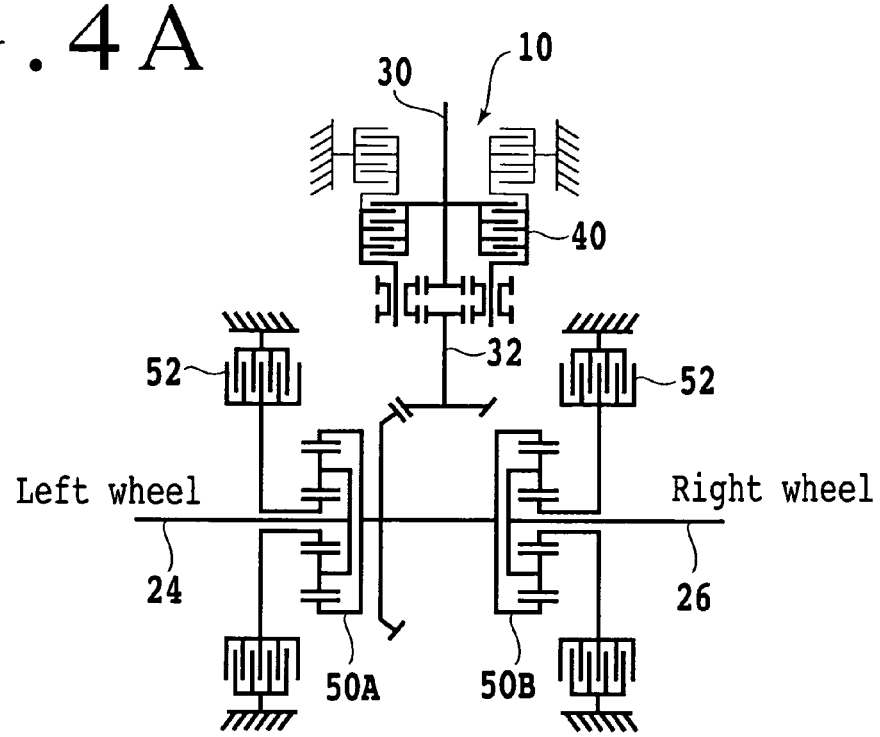
FIG. 4A is a diagram showing the transmission of power to the rear wheels during straight running at acceleration.
Figure 4B:
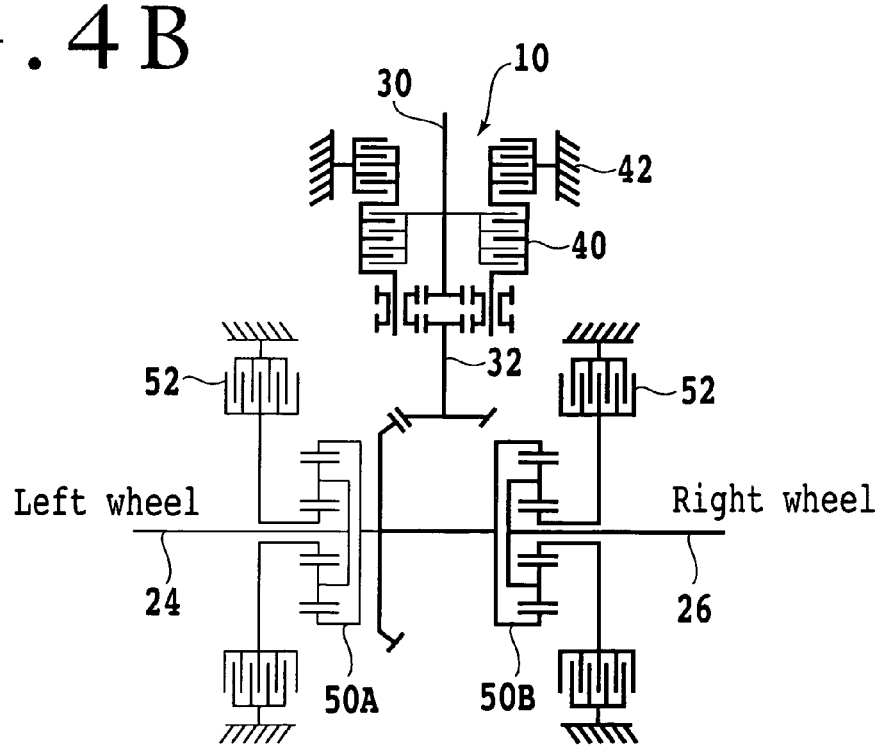
FIG. 4B is a diagram showing the transmission of power to the rear wheels during turning at acceleration.

FIG. 4A shows the condition where the lockup clutch 40 is engaged at acceleration during straight running. In this condition, the torque is transmitted uniformly to the left and right rear axles 24 and 26. In FIGS. 4A and 4B, torque transmission paths are shown by bold lines. FIG. 4B shows the condition where the speed increasing clutch 42 is engaged at acceleration during left turning. In this condition, the engaging force of the right clutch 52 is controlled to become larger than the engaging force of the left clutch 52, thereby increasing the torque distribution to the right rear axle 26.

While the operational conditions shown in Tables 1A and 1B are the general outlines of the drive force control method according to the present invention, the drive force control method will now be described in detail.

Figure 5:
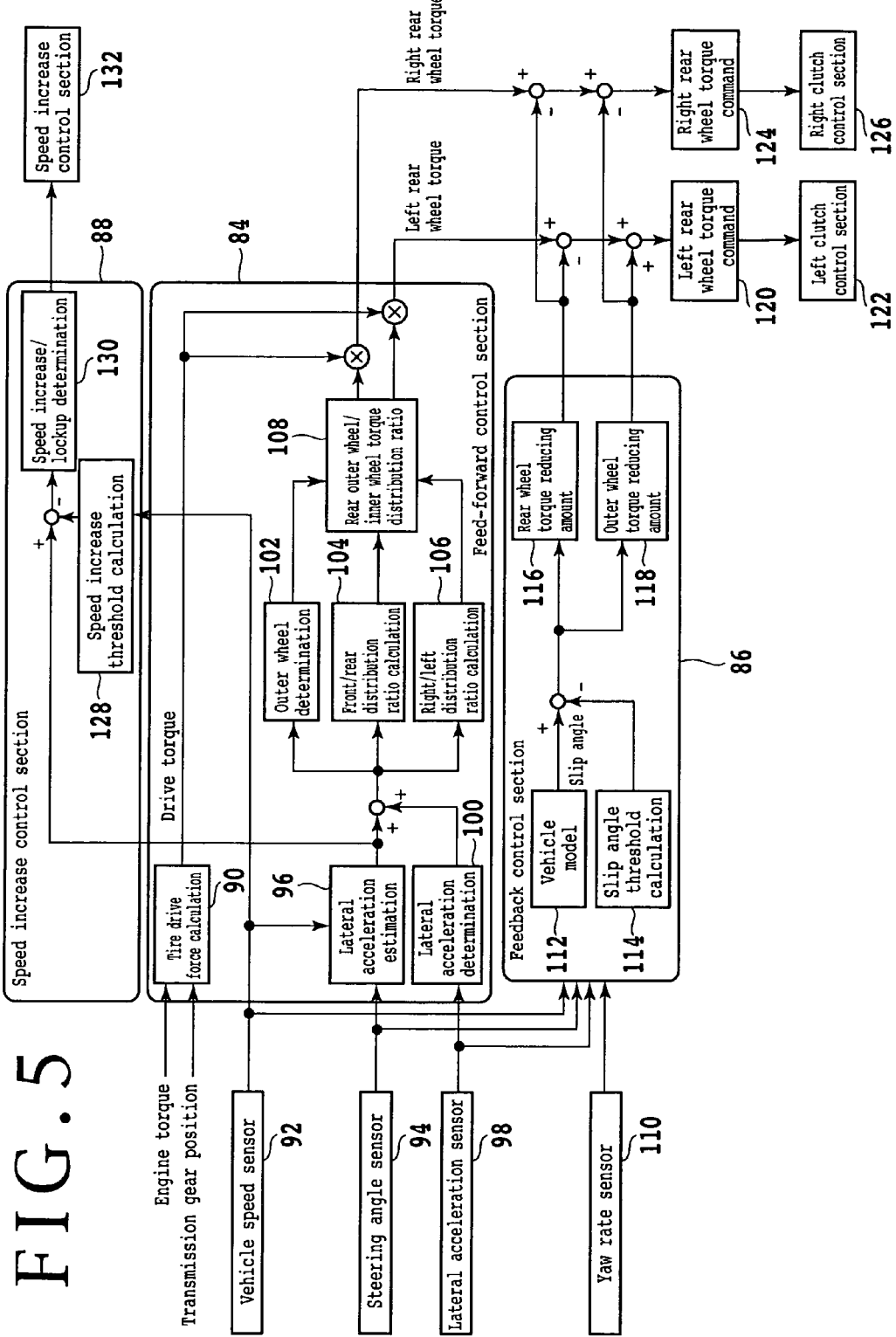
FIG. 5 is a block diagram of a control system according to a preferred embodiment of the present invention.

FIG. 5 is a block diagram of a control system according to the present invention. This control system has a feed-forward control section 84, a feedback control section 86, and a speed increase control section 88. Engine torque and transmission gear position are input into a block 90 in the feed-forward control section 84 to calculate a tire drive force. A vehicle speed detected by a vehicle speed sensor 92 and a steering angle detected by a steering angle sensor 94 are input into a block 96 to calculate an estimated lateral acceleration (estimated lateral G).

A lateral acceleration (lateral G) detected by a lateral acceleration sensor (lateral G sensor) 98 is input into a block 100 to determine a lateral acceleration (lateral G). The lateral G output from the block 100 is corrected by the estimated lateral G output from the block 96 to obtain a control lateral G signal. This correction is made by averaging the lateral G signal and the estimated lateral G signal, for example. The control lateral G signal is input into an outer wheel decision block 102 to determine which of the right and left rear wheels is an outer wheel. The control lateral G signal is also input into a block 104 to calculate a torque distribution ratio between the front and rear wheels, and is also input into a block 106 to calculate a torque distribution ratio between the right and left wheels.

An outer wheel signal from the outer wheel decision block 102, a rear wheel distribution ratio signal from the block 104, and a rear outer wheel distribution ratio signal from the block 106 are input into a block 108 to obtain a torque distribution ratio between the rear outer wheel and the rear inner wheel. The vehicle speed detected by the vehicle speed sensor 92, the steering angle detected by the steering angle sensor 94, the lateral G detected by the lateral G sensor 98, and a yaw rate detected by a yaw rate sensor 110 are input into a vehicle model block 112 in the feedback control section 86 to calculate a slip angle of the vehicle. Further, a slip angle threshold is calculated by a block 114 according to the vehicle speed detected by the vehicle speed sensor 92 and the lateral G detected by the lateral G sensor 98.

A rear wheel torque reducing amount is obtained by a block 116 according to a difference between the slip angle and the slip angle threshold, and an outer wheel torque reducing amount is obtained by a block 118 according to this difference. In other words, if the slip angle of the vehicle is greater than a predetermined value, it is determined that the vehicle is in an unstable condition, and the rear wheel distributed torque and the outer wheel distributed torque are reduced to eliminate this unstable condition. A left rear wheel torque command value is generated by a block 120 according to the drive torque calculated by the block 90, the left rear wheel torque from the block 108, the rear wheel torque reducing amount from the block 116, and the outer wheel torque reducing amount from the block 118, and the left electromagnetic actuator 56 is controlled by a left clutch control section 122 according to the left rear wheel torque command value generated above.

Similarly, a right rear wheel torque command value is generated by a block 124 according to the drive torque calculated by the block 90, the right rear wheel torque from the block 108, the rear wheel torque reducing amount from the block 116, and the outer wheel torque reducing amount from the block 118, and the right electromagnetic actuator 56 is controlled by a right clutch control section 126 according to the right rear wheel torque command value generated above.

A speed increase threshold is calculated by a block 128 in the speed increase control section 88 according to the vehicle speed detected by the vehicle speed sensor 92. The estimated lateral G calculated by the block 96 and the speed increase threshold calculated by the block 128 are compared with each other, and it is determined by a block 130 that a speed increasing condition is to be provided when the estimated lateral G is greater than the speed increase threshold, whereas the lockup condition is to be provided when the estimated lateral G is not greater than the speed increase threshold. A speed increase signal or a lockup signal from the block 130 is input into a speed increasing device control section 132 to control the speed increase/lockup of the speed increasing device 10.

The drive force control method of the present invention will now be described in detail. When the vehicle is accelerated during turning, the vertical loads on the inner wheels and the front wheels are reduced by the influence of lateral and longitudinal accelerations acting on the vehicle body. Further, since the front wheels are steered for turning, a lateral force acting on the front wheels is greater than that acting on the rear wheels. The greater the vertical load, the greater the drive force that can be generated by each tire. Therefore, the load on the tire of each front wheel is greater than the load on the tire of each rear wheel during turning at acceleration, and the load on the tire of each inner wheel is greater than the load on the tire of each outer wheel during turning at acceleration.

Figure 6:
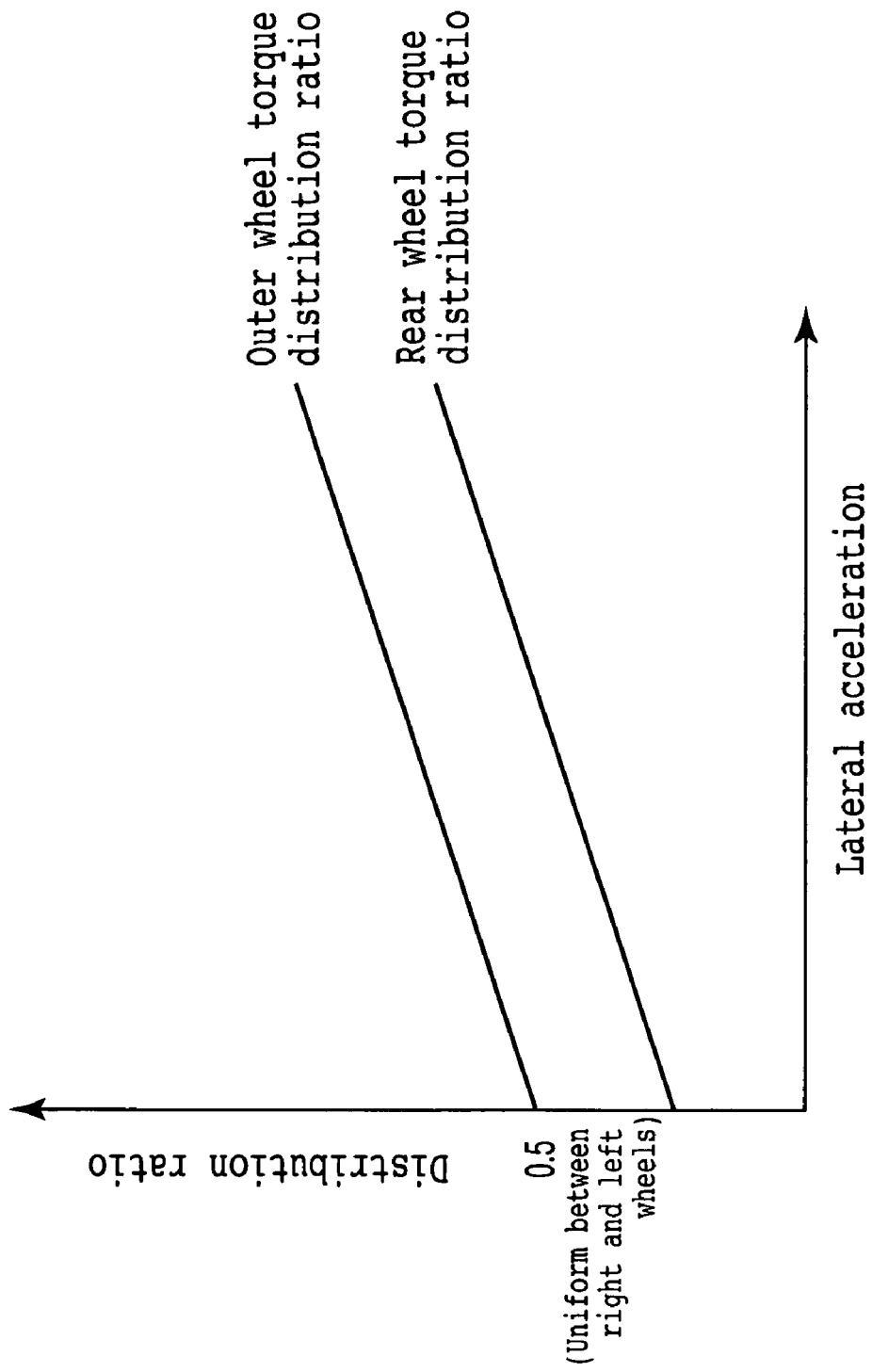
FIG. 6 is a graph showing the relation between lateral G and torque distribution ratios of the outer wheel and the rear wheels.

The load on each tire depends on the degree of turning (the magnitude of lateral G) and the magnitude of acceleration. Owing to this tendency, understeer occurs in the vehicle during turning at acceleration, and the running locus of the vehicle is deviated to the outside of turn. As a result, the acceleration performance during turning is limited. It is effective to make the load on each tire uniform in improving this acceleration performance. According to the drive force control method of the present invention, the torque distribution ratio between the front and rear wheels is controlled so that the rear wheel torque is increased with an increase in lateral acceleration (lateral G), and the torque distribution ratio between the right and left wheels is controlled so that the outer wheel torque is increased with an increase in lateral G as shown in FIG. 6. Thus, the rear wheel torque distribution ratio and the outer wheel torque distribution ratio are increased with an increase in lateral G. Accordingly, understeer occurring during turning at acceleration can be suppressed to thereby allow stable acceleration.

Figure 7:
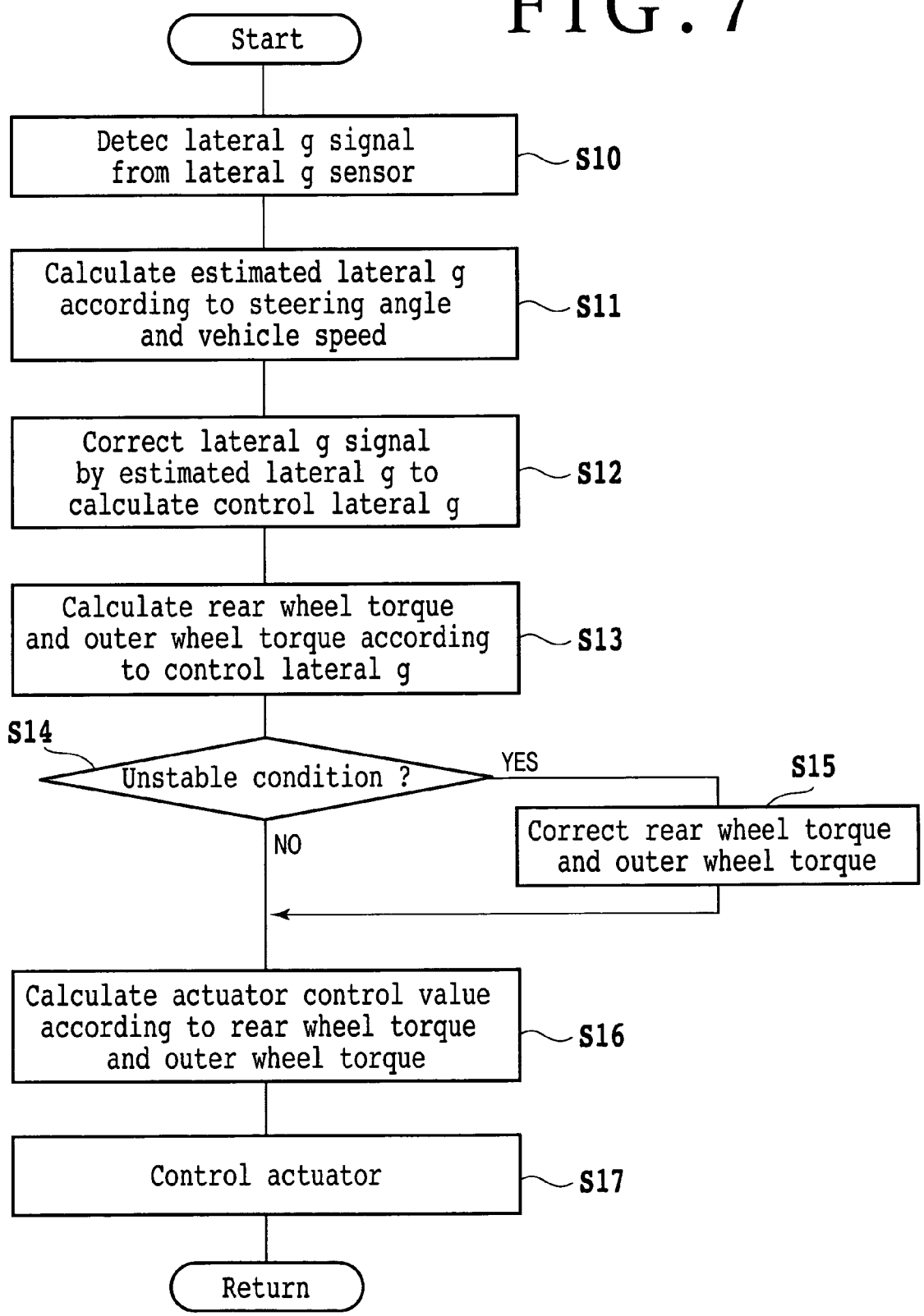
FIG. 7 is a flowchart showing the processing of calculating a drive force distribution ratio between the front and rear wheels and a drive force distribution ratio between the right and left rear wheels in the preferred embodiment of the present invention.

The torque distribution between the front and rear wheels and the torque distribution between the right and left rear wheels will now be described in detail with reference to the flowchart shown in FIG. 7. In step 10 (shown by "S10" in FIG. 7), the lateral G signal from the lateral G sensor 98 is detected. In step 11, the estimated lateral G is calculated according to the steering angle detected by the steering angle sensor 94 and the vehicle speed detected by the vehicle speed sensor 92. In step 12, the lateral G signal is corrected by the estimated lateral G signal to calculate the control lateral G. This correction is performed by averaging the lateral G signal and the estimated lateral G signal, for example.

The use of an output signal from a lateral G sensor as the lateral G signal is most general. However, it is known that the output from the lateral G sensor delays from a turning operation by the operator. Further, an actuator for performing the torque distribution generally has delay characteristics. Accordingly, if only the output signal from the lateral G sensor is used, control delay occurs. To suppress such control delay, the estimated lateral G is calculated according to the steering angle and the vehicle speed detected and the output signal from the lateral G sensor is corrected by the estimated lateral G signal obtained above according to this preferred embodiment. Since the steering angle is a turning operation itself by the operator, the estimated lateral G signal can be generated earlier than the output signal from the lateral G sensor. As a result, a control command can be early output to thereby allow quick-response control.

After calculating the control lateral G in step 12, the program proceeds to step 13 to calculate the rear wheel torque and the outer wheel torque according to the control lateral G. In step 14, it is determined whether or not the vehicle is in an unstable condition. For example, in the case that the slip angle of the vehicle is greater than a predetermined value or the change rate of the slip angle is greater than a predetermined value, it is determined that the vehicle is in an unstable condition. These predetermined values may be changed according to the condition of a road surface. For example, the smaller the coefficient of friction ($\mu$) between a road surface and each tire, the smaller the predetermined values to be set. Accordingly, the unstable condition can be detected earlier and more accurately.

Figure 8:
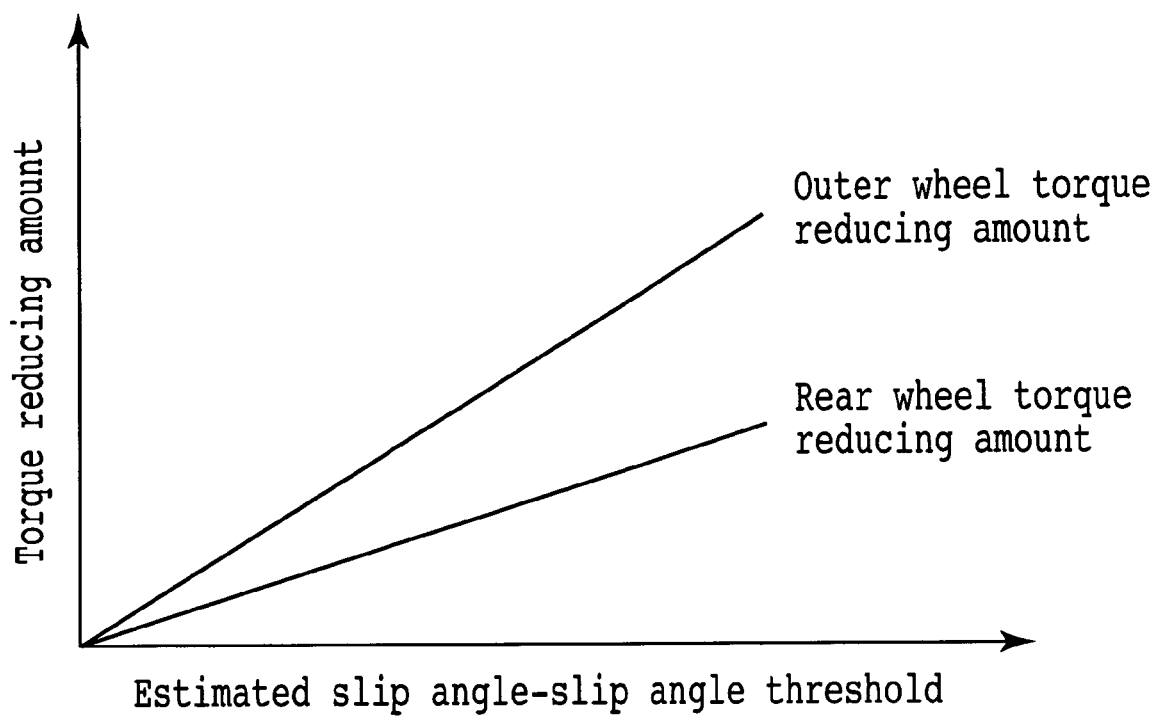
FIG. 8 is a graph showing the relation between estimated slip angle and torque reducing amounts to the outer wheel and the rear wheels.

If the unstable condition of the vehicle is detected, the program proceeds to step 15 to obtain a rear wheel torque reducing amount and an outer wheel torque reducing amount and to correct the rear wheel torque and the outer wheel torque according to these reducing amounts, respectively. The rear wheel torque reducing amount and the outer wheel torque reducing amount are increased with an increase in estimated slip angle as shown in FIG. 8. In other words, the unstable condition of the vehicle is corrected in step 15 by making the torque distribution ratio between the front and rear wheels greater on the front wheel side and making the torque distribution ratio between the right and left wheels smaller on the outer wheel side.

If the unstable condition of the vehicle is not determined in step 14 or after the rear wheel torque and the outer wheel torque are corrected in the unstable condition of the vehicle in step 15, the program proceeds to step 16 to calculate an actuator control value according to the rear wheel torque and the outer wheel torque. This actuator control value includes control values for the right and left electromagnetic actuators 56 and control values for the lockup clutch 40 and the speed increasing clutch 42 of the speed increasing device 10. In step 17, the right and left electromagnetic actuators 56 are controlled and whether the speed increasing device 10 is to become a lockup condition or a speed increasing condition is controlled according to the above control values. The degree of this speed increase is set so that the rotational speed of the output shaft 32 becomes greater by about 5% than the rotational speed of the input shaft 30, for example.

Figure 9:
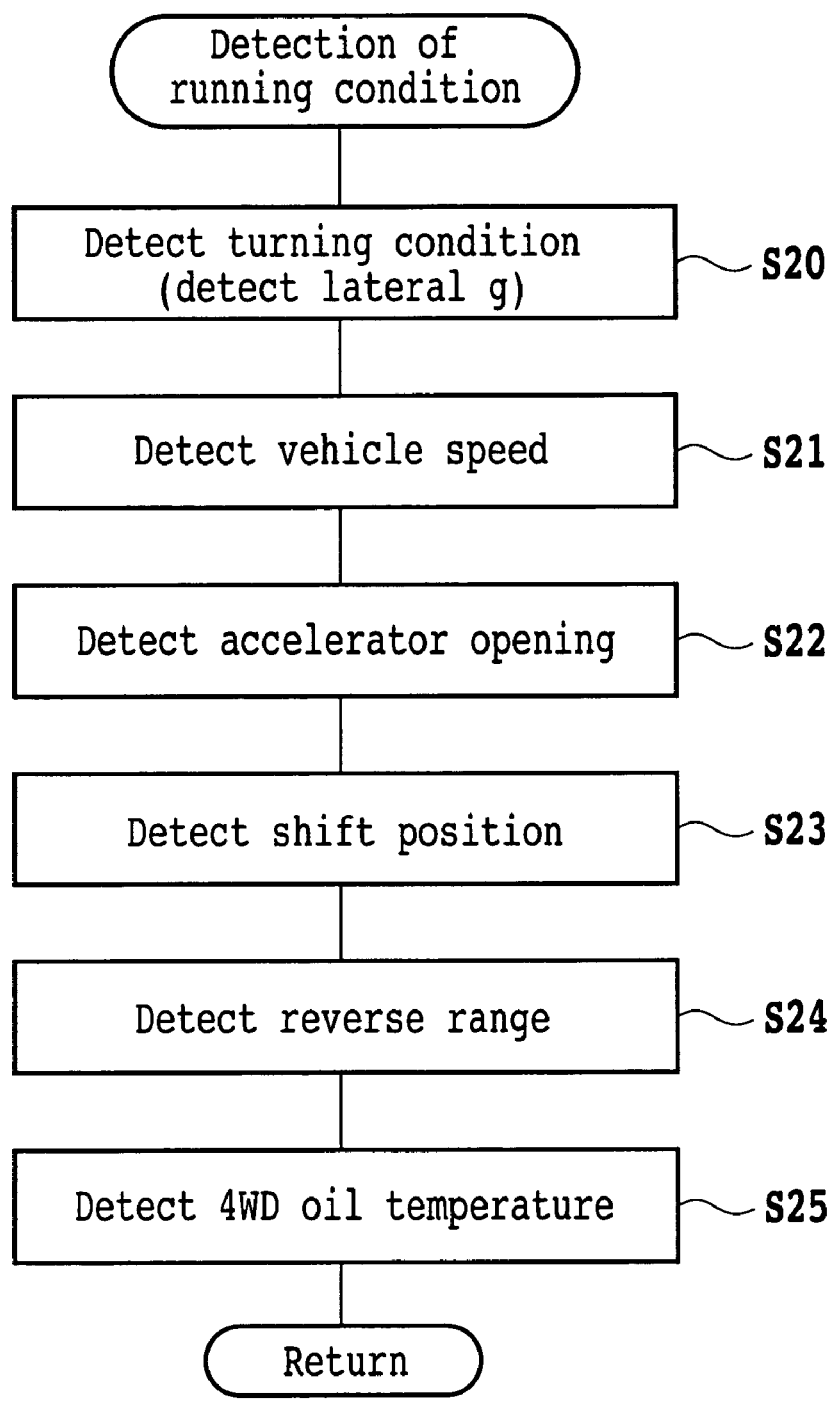
FIG. 9 is a flowchart showing the detection of a running condition.
Figure 10:
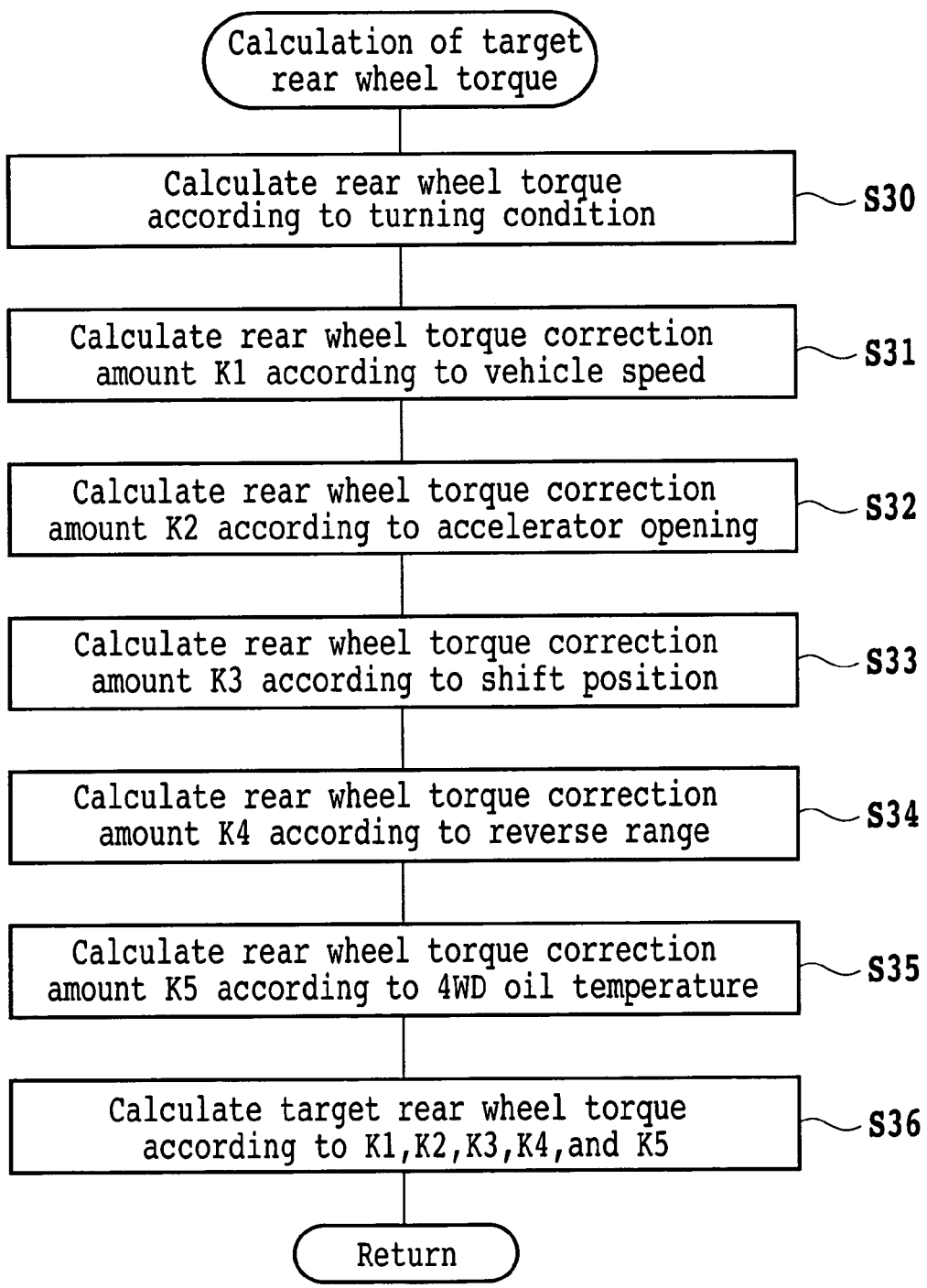
FIG. 10 is a flowchart showing the calculation of a target rear wheel torque.

A control method for drive force (torque) distribution between the front and rear wheels of the four-wheel drive vehicle will now be described with reference to the flowcharts shown in FIGS. 9 to 11. Running condition detection processing will now be described with reference to the flowchart shown in FIG. 9. In step 20, a turning condition is detected. More specifically, the lateral G signal detected by the lateral G sensor 98 is corrected by the estimated lateral G calculated according to the vehicle speed and the steering angle to calculate the control lateral G.

Figure 12:
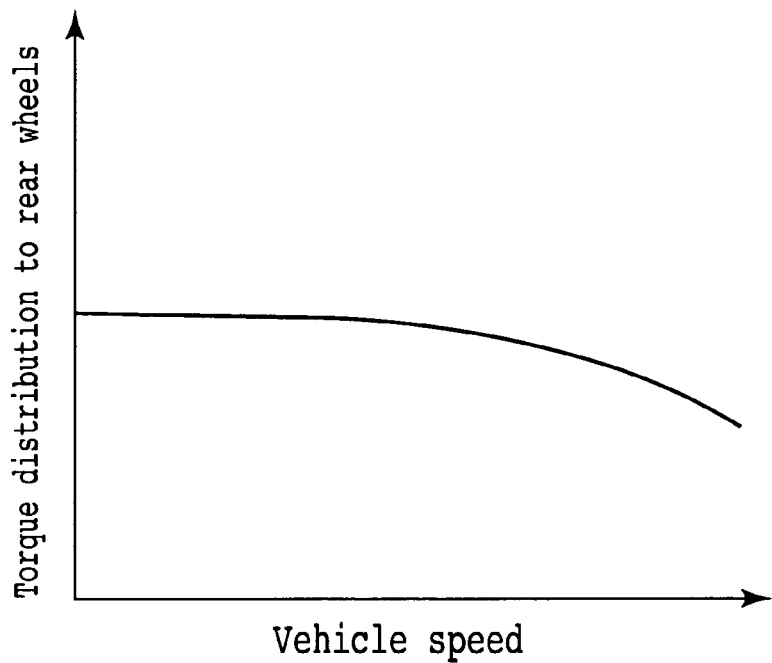
FIG. 12 is a graph showing the relation between vehicle speed and torque distribution to the rear wheels.

In step 21, a vehicle speed is detected from the signal from the vehicle speed sensor 92. In step 22, an accelerator opening is detected. In step 23, a transmission shift position is detected. In step 24, a transmission reverse range is detected. In step 25, a 4WD oil temperature, or an oil temperature of the rear differential device 12 is detected. Target rear wheel torque calculation processing will now be described with reference to the flowchart shown in FIG. 10. In step 30, a rear wheel torque according to the turning condition is calculated. In step 31, a rear wheel torque correction amount K1 according to the vehicle speed is calculated. In this preferred embodiment, the torque distribution to the rear wheels is decreased with an increase in the vehicle speed by using the correction amount K1 as shown in FIG. 12.

Figure 13:
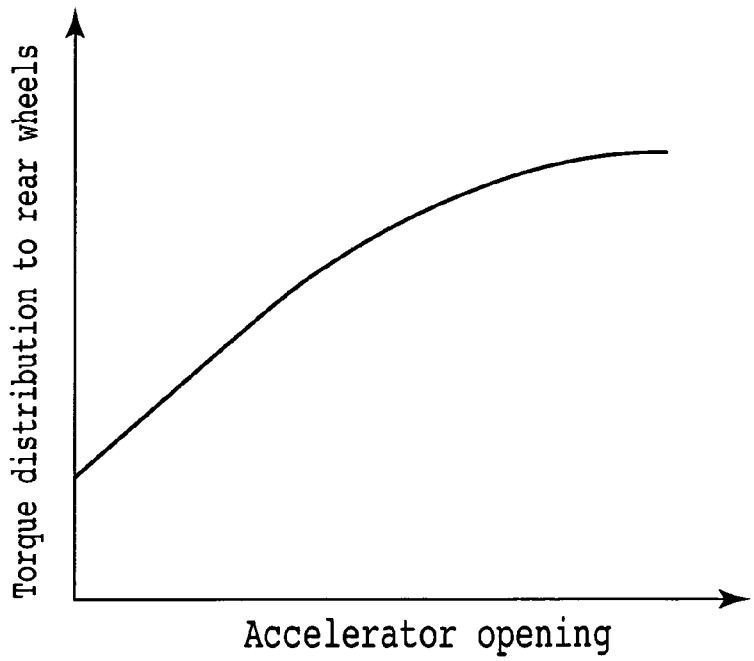
FIG. 13 is a graph showing the relation between accelerator opening and torque distribution to the rear wheels.
Figure 14:
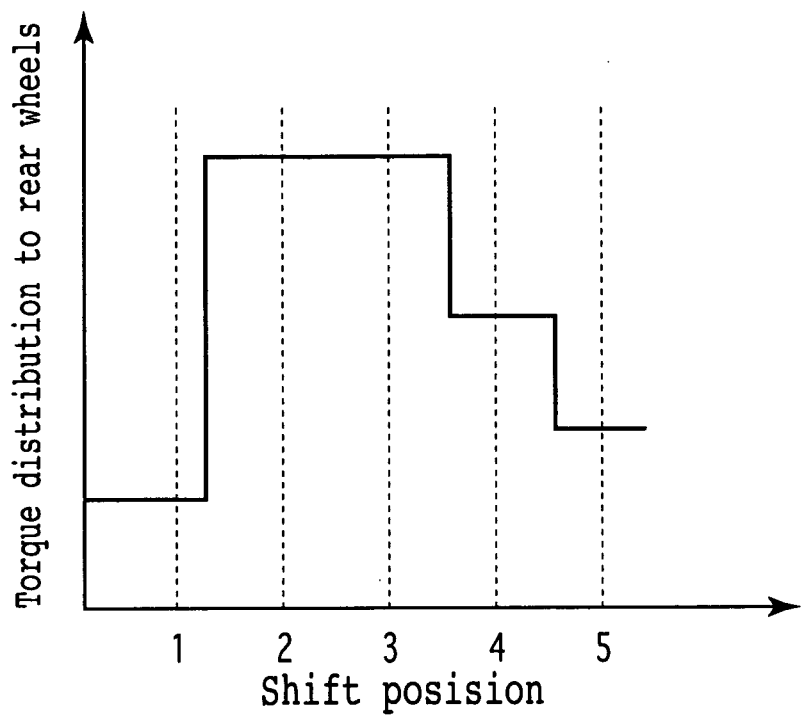
FIG. 14 is a graph showing the relation between shift position and torque distribution to the rear wheels.

In step 32, a rear wheel torque correction amount K2 according to the accelerator opening is calculated. In this preferred embodiment, the torque distribution to the rear wheels is increased with an increase in the accelerator opening by using the correction amount K2 as shown in FIG. 13. In step 33, a rear wheel torque correction amount K3 according to the transmission shift position is calculated. In this preferred embodiment, the torque distribution to the rear wheels is decreased by using the correction amount K3 in the case that the transmission shift position is a low-speed position or a high-speed position as shown in FIG. 14.

Figure 15:
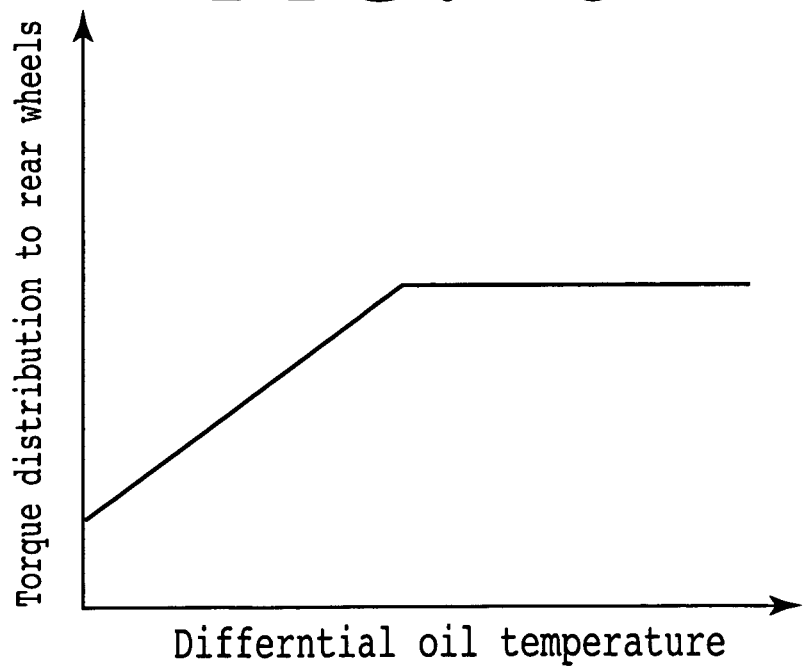
FIG. 15 is a graph showing the relation between rear differential oil temperature and torque distribution to the rear wheels.

In step 34, a rear wheel torque correction amount K4 according to the reverse range is calculated. In this preferred embodiment, the torque distribution to the rear wheels is decreased by using the correction amount K4 in the case of reverse running. In step 35, a rear wheel torque correction amount K5 according to the 4WD oil temperature, or the oil temperature of the rear differential device 12 is calculated. In this preferred embodiment, the torque distribution to the rear wheels is decreased with a decrease in the oil temperature of the rear differential device 12 by using the correction amount K5 as shown in FIG. 15.

In step 36, the rear wheel torque calculated in step 30 is corrected according to the correction amounts K1, K2, K3, K4, and K5 to thereby calculate a target rear wheel torque. In step 40 of the flowchart showing 4WD control in FIG. 11, an actuator control value is calculated according to the target rear wheel torque. In step 41, the actuator is controlled according to the actuator control value calculated above. More specifically, the degree of engagement of the right and left electromagnetic actuators 56 is controlled according to the control value to thereby control the torque distribution ratio between the front and rear wheels.

Figure 16:
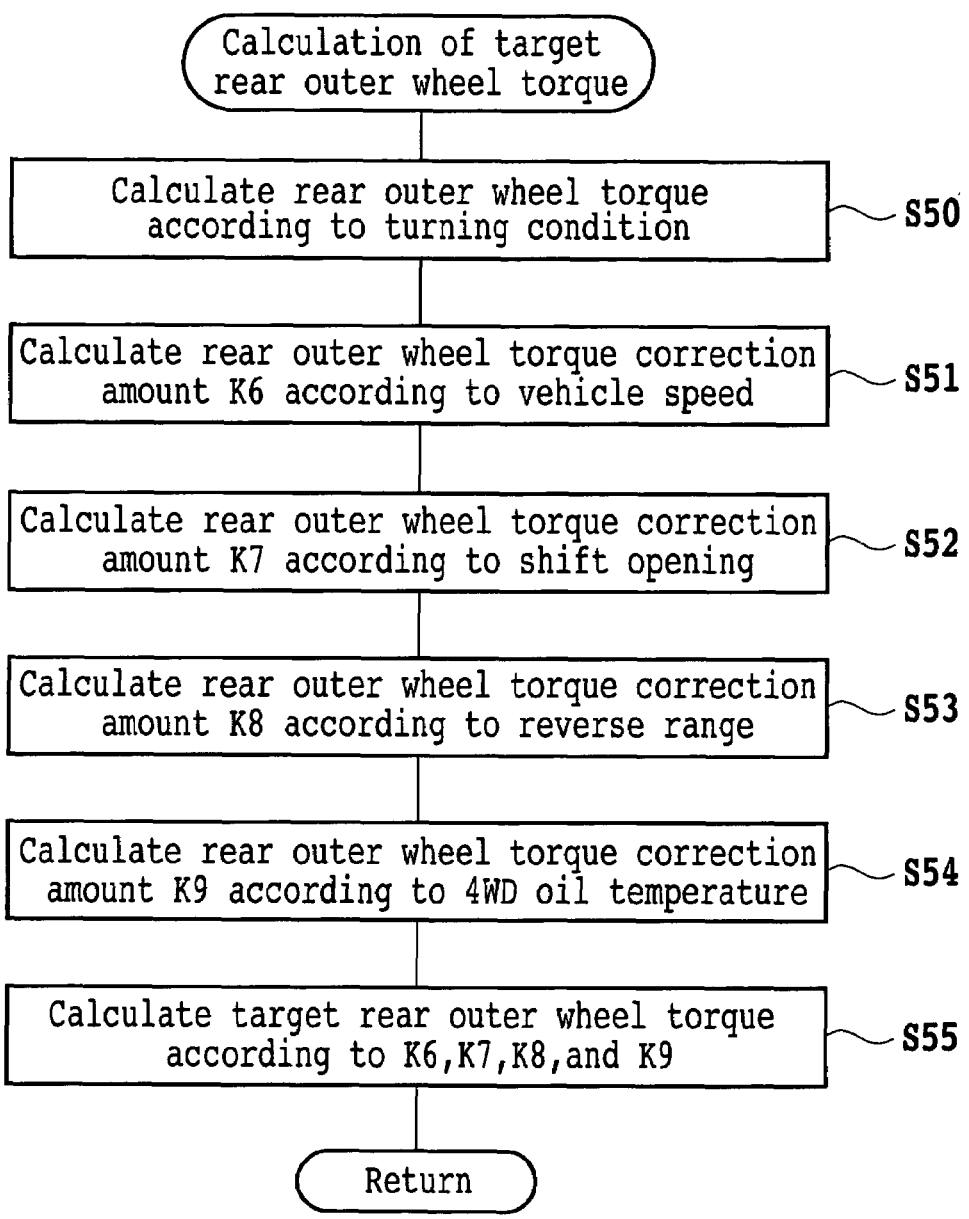
FIG. 16 is a flowchart showing the processing of calculating a target rear outer wheel torque.
Figure 17:
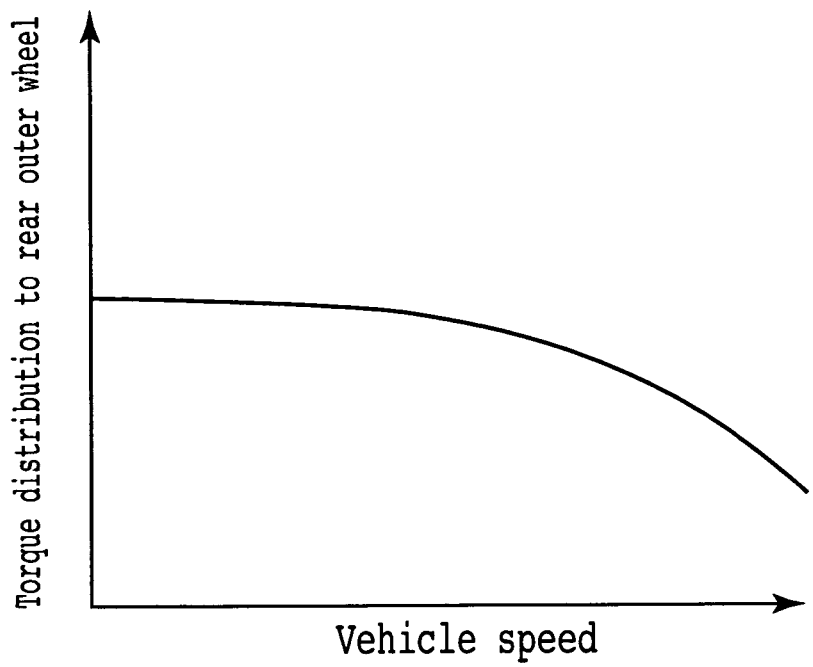
FIG. 17 is a graph showing the relation between vehicle speed and torque distribution to the rear outer wheel.

Target rear outer wheel torque calculation processing will now be described with reference to the flowchart shown in FIG. 16. In step 50, a rear outer wheel torque according to the turning condition is calculated. This turning condition is determined according to the lateral G. In step 51, a rear outer wheel torque correction amount K6 according to the vehicle speed is calculated. In this preferred embodiment, the torque distribution to the rear outer wheel is decreased with an increase in the vehicle speed by using the correction amount K6 as shown in FIG. 17.

Figure 18:
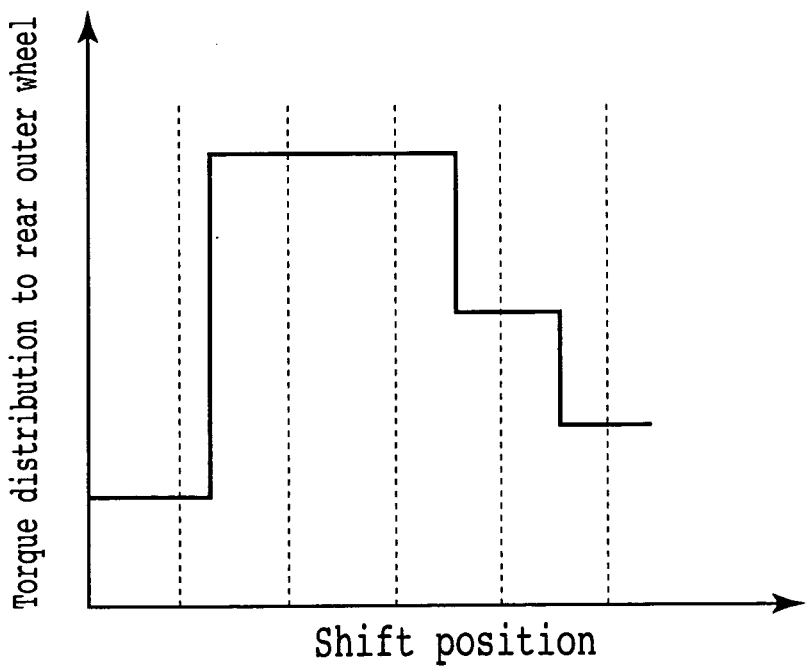
FIG. 18 is a graph showing the relation between shift position and torque distribution to the rear outer wheel.

In step 52, a rear outer wheel torque correction amount K7 according to the transmission shift position is calculated. In this preferred embodiment, the torque distribution to the rear outer wheel is decreased by using the correction amount K7 in the case that the transmission shift position is a low-speed position or a high-speed position as shown in FIG. 18. In step 53, a rear outer wheel torque correction amount K8 according to the reverse range is calculated. In this preferred embodiment, the torque distribution to the rear outer wheel is decreased by using the correction amount K8 in the case of reverse running.

Figure 19:
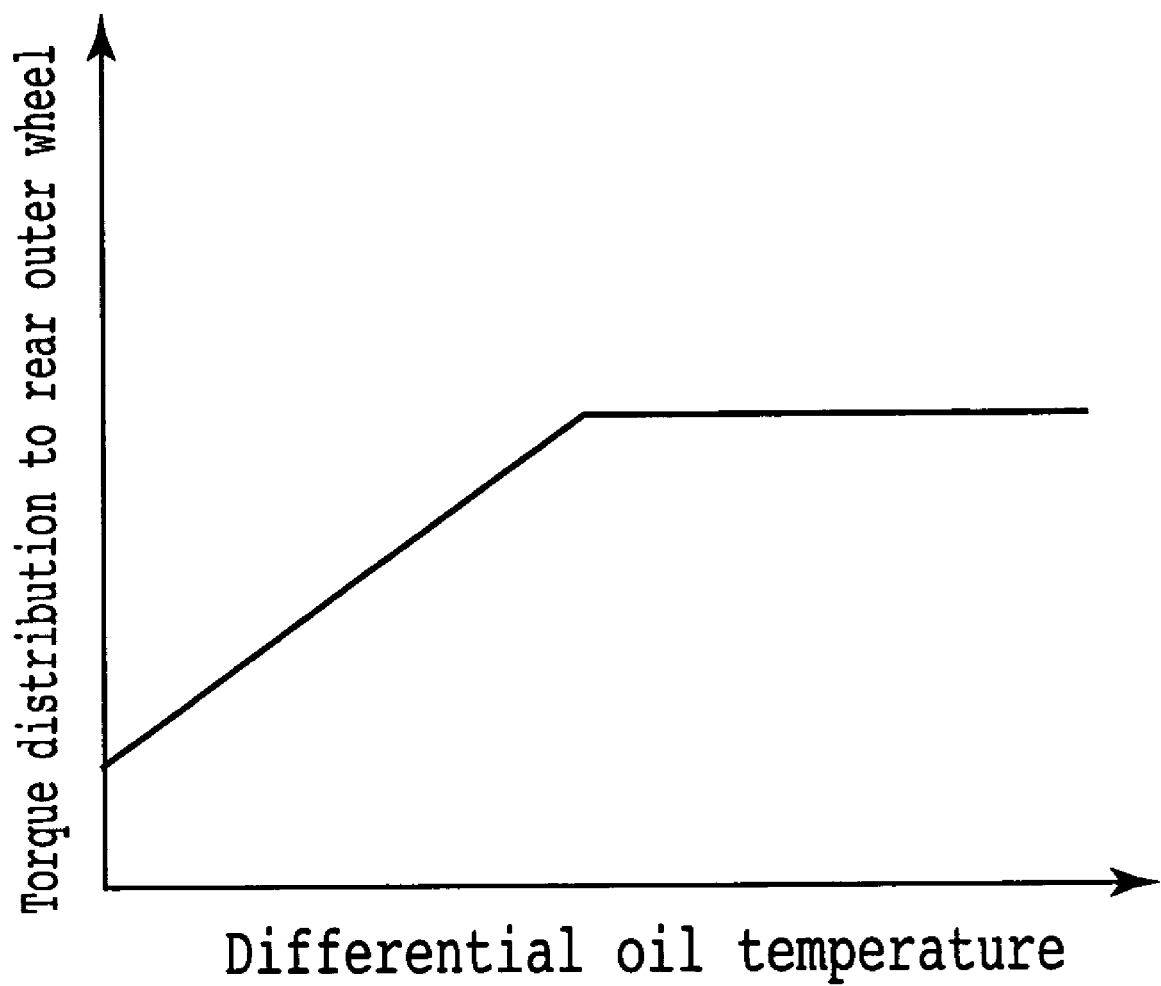
FIG. 19 is a graph showing the relation between rear differential oil temperature and torque distribution to the rear outer wheel.

In step 54, a rear outer wheel torque correction amount K9 according to the 4WD oil temperature, or the oil temperature of the rear differential device 12 is calculated. In this preferred embodiment, the torque distribution to the rear outer wheel is decreased with a decrease in temperature of hydraulic fluid for the rear differential device 12 by using the correction amount K9 as shown in FIG. 19. In step 55, the rear outer wheel torque calculated in step 50 is corrected according to the correction amounts K6, K7, K8, and K9 to thereby calculate a target rear outer wheel torque.

Figure 11:
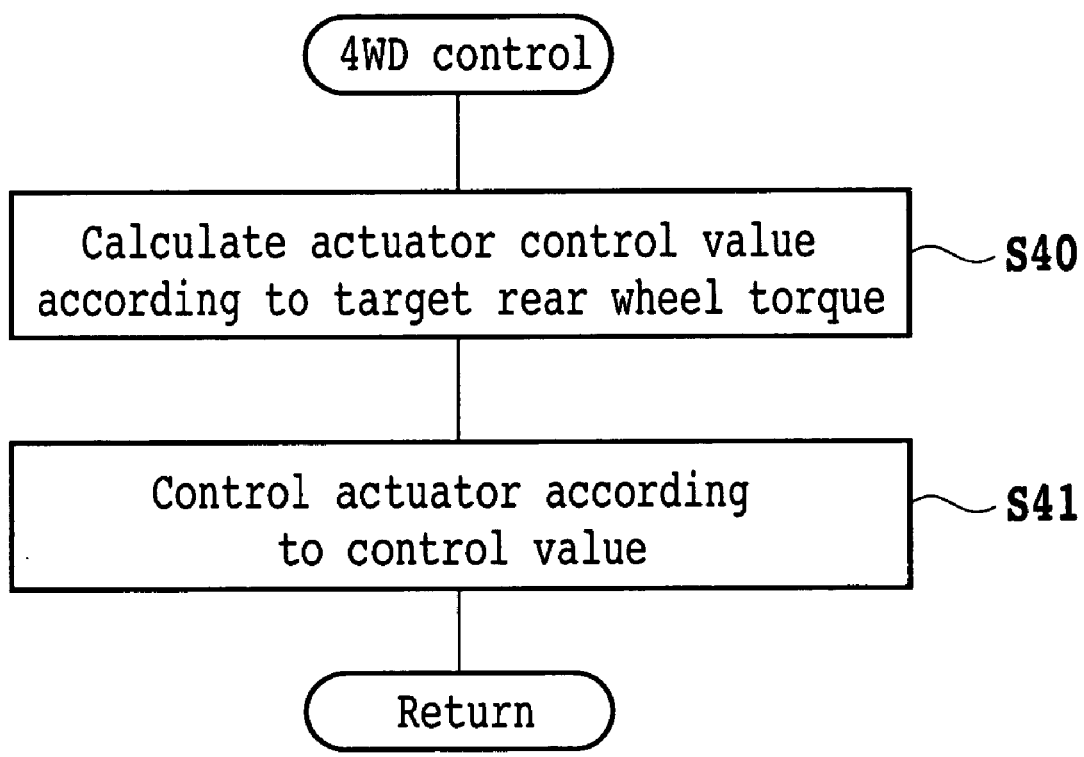
FIG. 11 is a flowchart showing 4WD control according to the target rear wheel torque.

Further, as in step 40 of the flowchart shown in FIG. 11, an actuator control value is next calculated according to the target rear outer wheel torque calculated above, and as in step 41 in FIG. 11, the degree of engagement of the right and left electromagnetic actuators 56 are controlled according to the control value calculated above. The lockup/speed increase control for the speed increasing device 10 will now be described. The object of the lockup/speed increase control for the speed increasing device 10 is to operate the speed increasing device 10 so that the outer wheel can be driven during turning.

Accordingly, the lateral G signal is used to quickly and accurately determine the turning condition. In a straight running condition of the vehicle, the lateral G is zero. Accordingly, by using a small value as a lateral G threshold, the speed increasing device 10 can be controlled to a speed increase condition immediately after the vehicle starts turning. For example, when the lateral G signal for the vehicle exceeds the lateral G threshold according to the vehicle speed, the lockup condition of the speed increasing device 10 is changed to the speed increase condition. As a result, the speed increasing can be performed before largely driving the outer wheel to thereby ensure a condition where the outer wheel can be driven. Accordingly, a larger drive force can be applied to the outer wheel as compared with the inner wheel, thereby improving the turning performance.

Further, by using the estimated lateral G signal calculated according to the steering angle and the vehicle speed as the lateral G signal, the lateral G signal can be obtained more quickly during the process of transition from the straight running condition to the turning condition. The steering angle is an input itself from the operator, and a delay of motion of the vehicle is added to the actual generation of lateral G. In compensating for the drawbacks of a lateral G sensor, it is also effective to partially correct the output signal from the lateral G sensor by using the estimated lateral G signal or to use the average of the lateral G signal and the estimated lateral G signal.

A speed increase command is generated after the decision of turning. If the speed increasing device 10 is operated immediately according to the speed increase command, the controller is influenced by the noise included in the signal, and a speed increase stop command is generated every time the turning direction changes as in slalom running, causing an increase in frequency of operation of the speed increasing device 10. In order to minimize the noise, shock, etc. due to the operation of the speed increasing device and reduce the frequency of operation of the speed increasing device with a reduced size and weight, the speed increasing device 10 is controlled so that the command to the speed increasing device 10 is not immediately executed, but the command is continued for about one second, for example, prior to performing the actual operation of the device 10.

Figure 20:
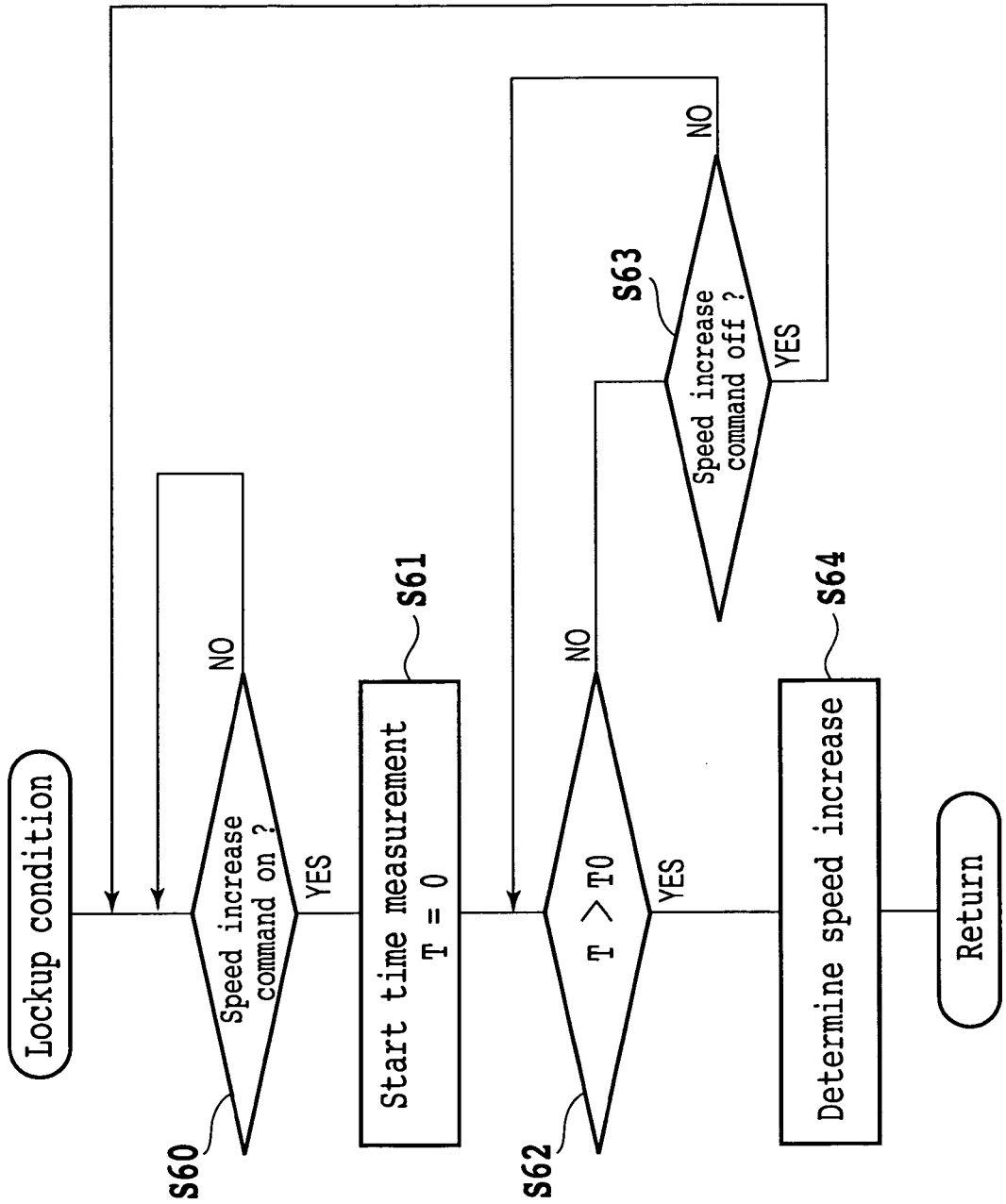
FIG. 20 is a flowchart showing the processing of controlling the change from a lockup condition to a speed increase condition.
Figure 21:
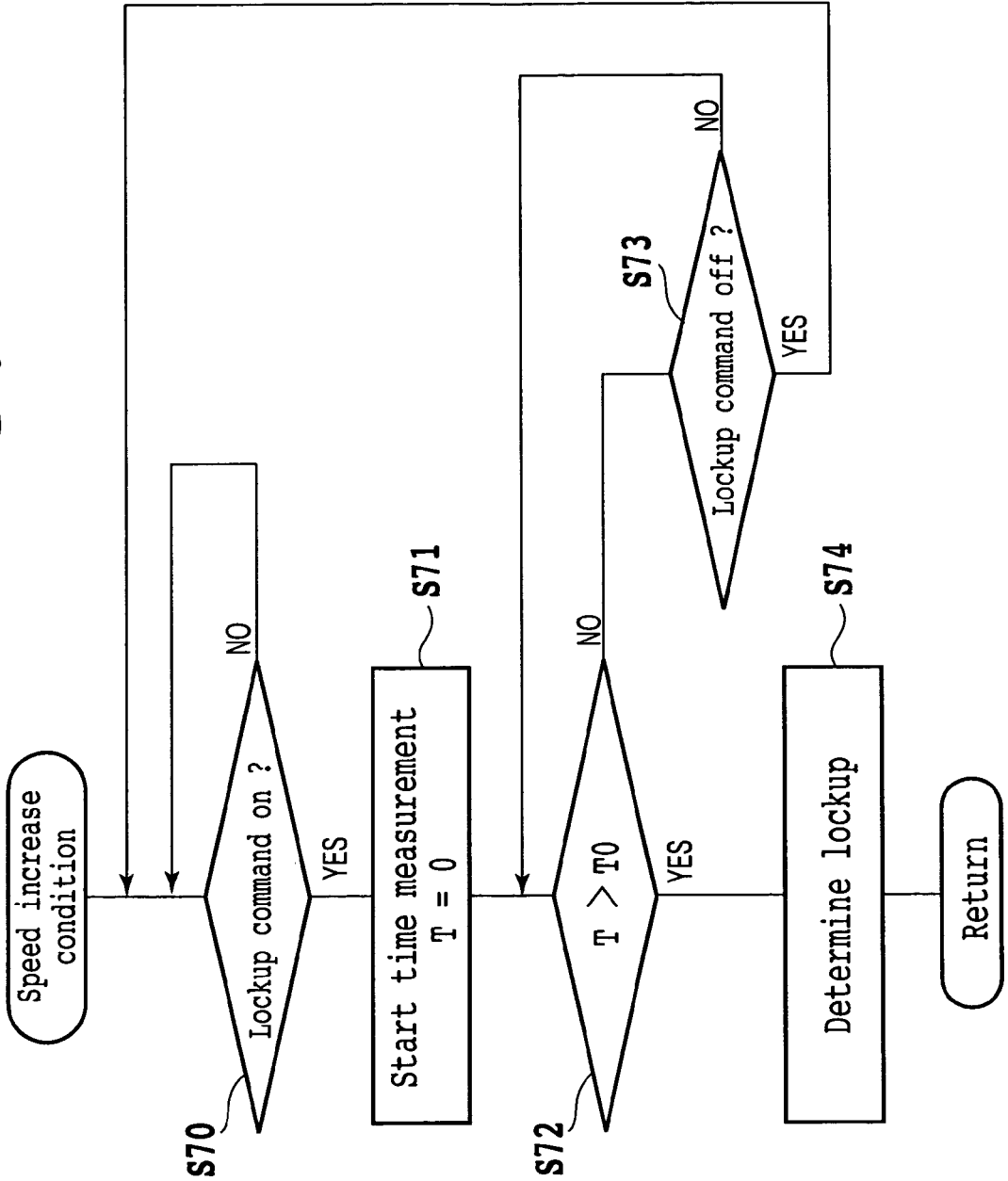
FIG. 21 is a flowchart showing the processing of controlling the change from a speed increase condition to a lockup condition.

This control will now be described with reference to the flowcharts shown in FIGS. 20 and 21. FIG. 20 shows the flowchart of change control from the lockup condition to the speed increase condition. In step 60, it is determined whether or not a speed increase command is ON. If the speed increase command is ON, the program proceeds to step 61 to start time measurement by a timer. In step 62, it is determined whether or not the measured time T is greater than a predetermined value T0.

If T>T0 in step 62, the program proceeds to step 64 to determine the speed increasing operation. Then, the lockup clutch 40 of the speed increasing device 10 is disengaged and the speed increasing clutch 42 is engaged. If the measured time T is less than or equal to the predetermined value T0 in step 62, the program proceeds to step 63 to determine whether or not the speed increase command is OFF. If the speed increase command is not OFF, the determination of step 62 is executed again, whereas if the speed increase command is OFF, the determination of step 60 is executed again.

Change control from the speed increase condition to the lockup condition will now be described with reference to the flowchart shown in FIG. 21. In step 70, it is determined whether or not a lockup command is ON. If the lockup command is ON, the program proceeds to step 71 to start time measurement by a timer. In step 72, it is determined whether or not the measured time T is greater than a predetermined value T0. If T>T0 in step 72, the program proceeds to step 74 to determine the lockup operation. Then, the speed increasing clutch 42 of the speed increasing device 10 is disengaged, and the lockup clutch 40 is engaged.

If the measured time T is less than or equal to the predetermined value T0 in step 72, the program proceeds to step 73 to determine whether or not the lockup command is OFF. If the lockup command is not OFF, the determination of step 72 is executed again, whereas if the lockup command is OFF, the determination of step 70 is executed again. The object of this speed increase control is to improve the maneuverability of the vehicle by driving the outer wheel more than the inner wheel. When the vehicle becomes an unstable condition, there is a case that any particular improvement in the maneuverability is not desired under any circumstances such as counter steer running.

Figure 22:
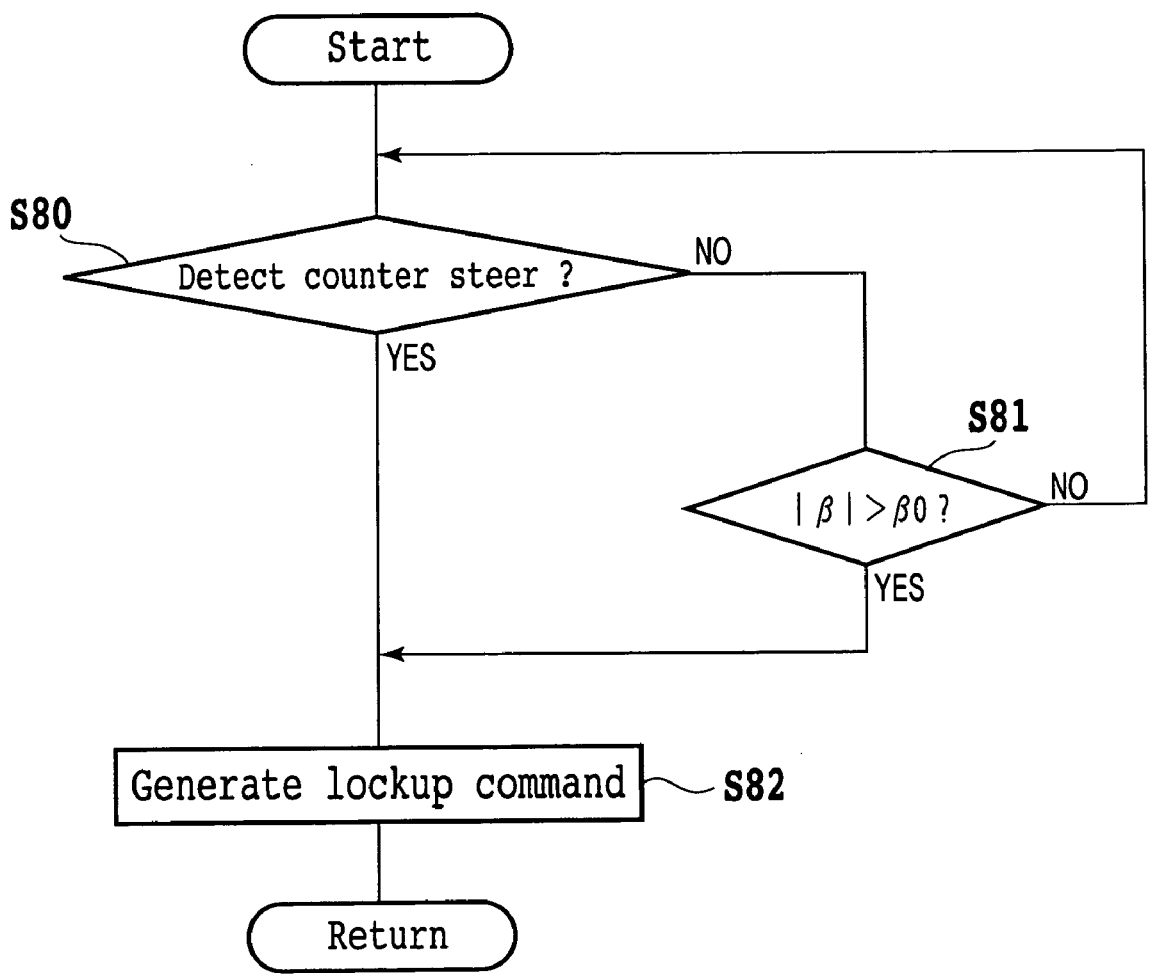
FIG. 22 is a flowchart showing the processing of stabilizing the behavior of the vehicle in an unstable condition of the vehicle.

For example, when the slip angle of the vehicle body becomes greater than a predetermined value or when counter steer such that the steering angle and the lateral G are different in sign is detected, the speed increase control is inhibited. Accordingly, outer wheel driving that may invite a further degradation in behavior can be avoided to thereby allow the stabilization of behavior. Such behavior stabilization control will now be described with reference to the flowchart shown in FIG. 22. In step 80, it is determined whether or not counter steer is detected. If the counter steer is detected, the program proceeds to step 82 to generate a lockup command, thereby engaging the lockup clutch 40 of the speed increasing device 10.

If the counter steer is not detected in step 80, the program proceeds to step 81 to determine whether or not the slip angle $\beta$ of the vehicle body is greater than a slip angle threshold $\beta 0$. If the slip angle $\beta$ is greater than the threshold $\beta 0$, it is determined that the behavior of the vehicle is unstable, and the program proceeds to step 82 to generate the lockup command, thereby engaging the lockup clutch 40 of the speed increasing device 10 to stabilize the behavior. In such circumstances that an improvement in driving stability is not desired or that a large effect cannot be obtained by the outer wheel driving as control, the speed increase control is inhibited to thereby allow a reduction in torque to be input into the speed increasing device 10 and a reduction in frequency of operation of the device 10. Accordingly, this is effective in reducing the weight of the device 10 and in improving the durability of the device 10.

Figure 23:
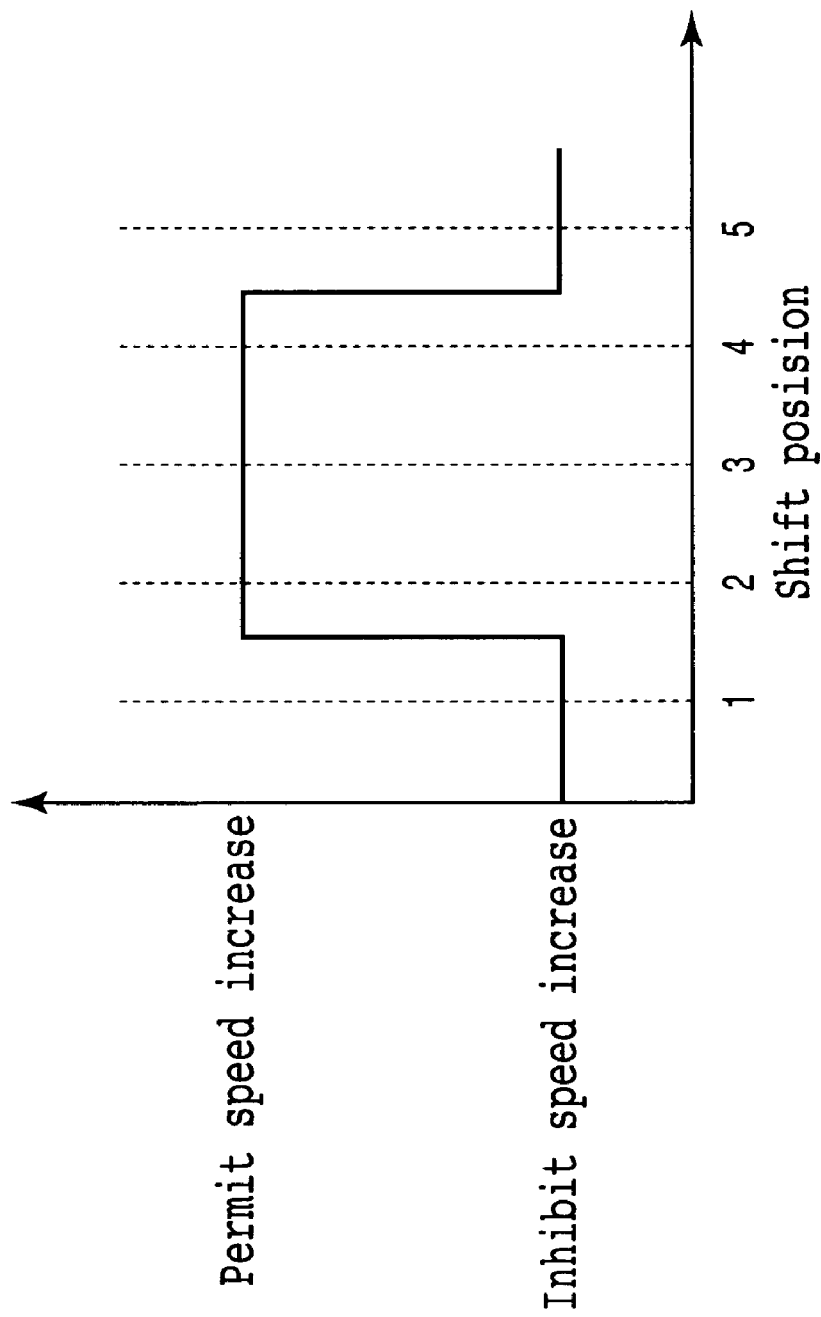
FIG. 23 is a graph showing the relation between shift position and permission/inhibition of the speed increase.

For example, when the shift position is a first-speed position or a fifth-speed position, the speed increase control is inhibited as shown in FIG. 23. That is, when the shift position is a first-speed position, a very large torque is generated. However, since the vehicle speed at the first-speed position is low, the effect by the outer wheel driving cannot be so obtained. Conversely, when the shift position is a fifth-speed position, the vehicle speed is too high and there is a danger that the vehicle is excessively turned. Therefore, the speed increase control is inhibited also in this case. In addition, when the shift position is in a reverse position, an improvement in driving stability cannot be expected and the speed increase control is therefore inhibited.

Further, in an engine brake condition or during braking where the drive force cannot be transmitted to the outer wheel, the speed increase control is also inhibited to thereby allow a reduction in torque to be input into the speed increasing device 10 and a reduction in frequency of operation of the device 10. Accordingly, the weight of the device 10 can be reduced and the durability of the device 10 can be improved. Further, by controlling the speed increasing device 10 into the lockup condition in the engine brake condition or during braking, a braking force can be applied to the outer wheel, and this is effective also in suppressing oversteer occurring in braking during turning.

Figure 24:
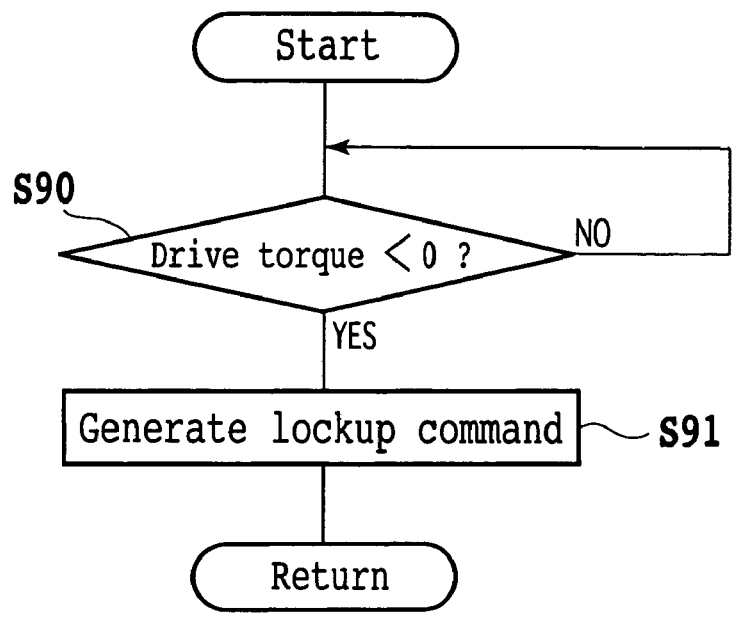
FIG. 24 is a flowchart showing the control in an engine brake condition.

Such control in the engine brake condition or during braking will now be described with reference to the flowcharts shown in FIGS. 24 and 25. FIG. 24 shows the flowchart of control in the engine brake condition. In step 90, it is determined whether or not the drive torque is negative, that is, whether or not the vehicle is in the engine brake condition. If the vehicle is in the engine brake condition, the program proceeds to step 91 to generate a lockup command, thereby disengaging the speed increasing clutch 42 of the speed increasing device 10 and engaging the lockup clutch 40.

Figure 25:
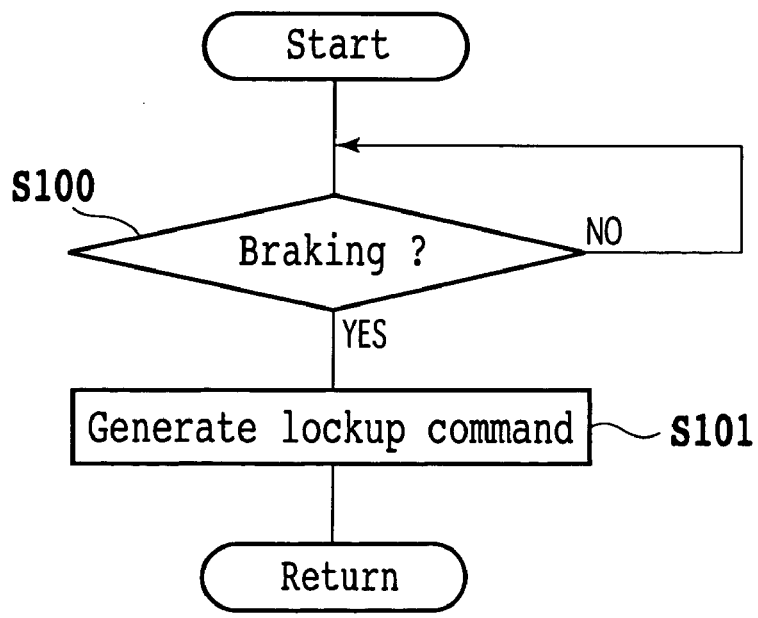
FIG. 25 is a flowchart showing the control during braking.

FIG. 25 shows the flowchart of control during braking. In step 100, it is determined whether or not the vehicle is being braked by the operator. If the vehicle is being braked by the operator, the program proceeds to step 101 to generate a lockup command, thereby disengaging the speed increasing clutch 42 of the speed increasing device 10 and engaging the lockup clutch 40. In the case that the operation of the speed increasing device 10 is relied on the oil pressure of a pump driven by an axle, there is a possibility that an oil pressure required for the speed increasing cannot be obtained at certain low vehicle speeds. If the control is relied on only the lateral G threshold, a speed increase command is undesirably generated in the stage where a sufficient oil pressure is not obtained, causing a possibility of adverse effects on the speed increasing clutch 42.

Further, when the vehicle speed becomes a value at which a sufficient oil pressure can be obtained, the lockup condition is shifted to the speed increase condition. Accordingly, even during turning at this vehicle speed or higher, the lockup condition is changed to the speed increase condition. To avoid possible instability of the behavior of the vehicle because of the above control, the change to the speed increase condition is inhibited until the vehicle runs straight at a given vehicle speed (V1) or more during low-speed running at a given vehicle speed (V0) or less. Accordingly, the speed increase control at the vehicle speed V0 or less can be avoided. Further, a rapid change to the speed increase condition during turning can also be prevented.

Figure 26:
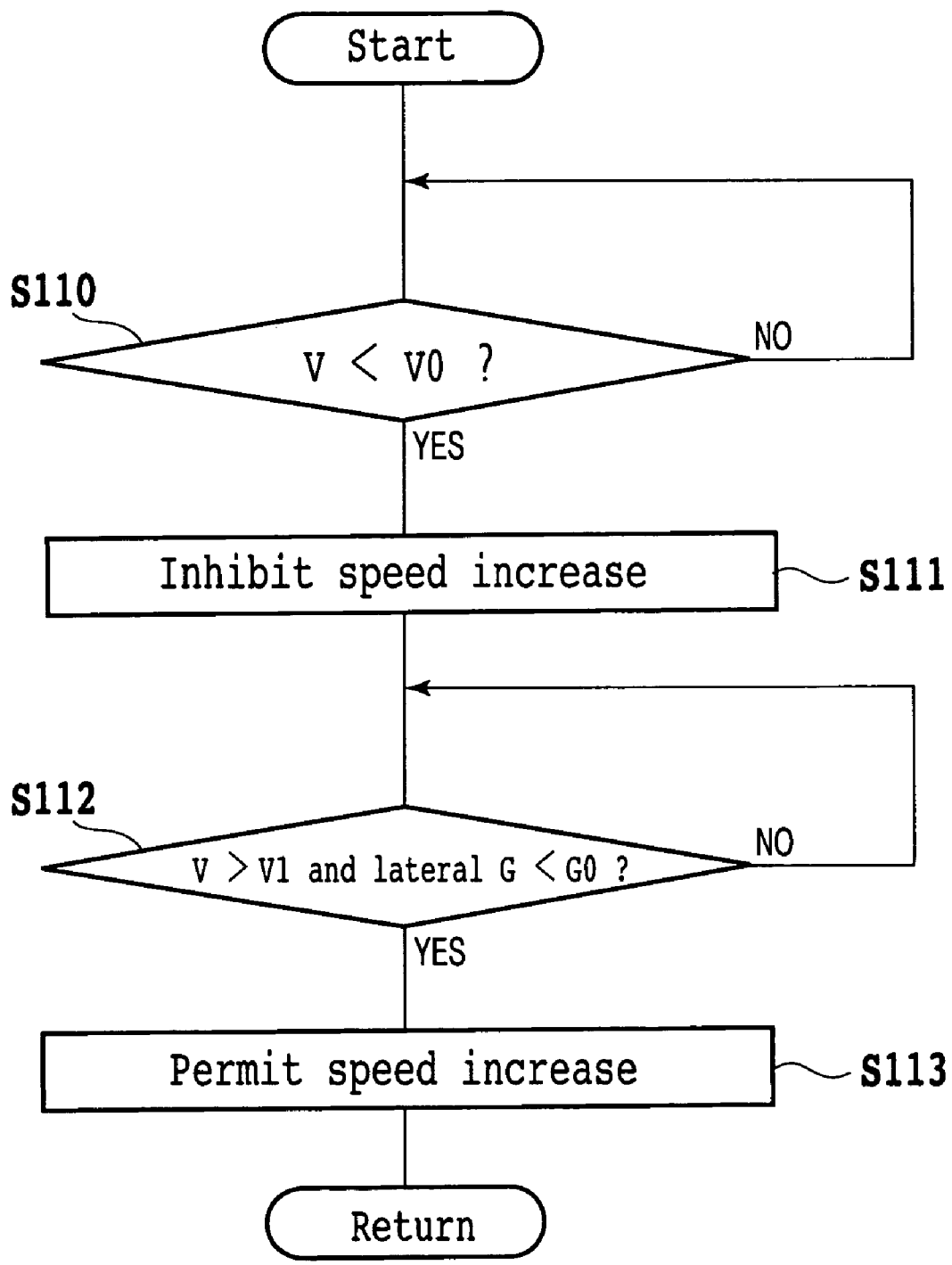
FIG. 26 is a flowchart showing the processing of permitting the speed increase condition after low-speed running.

This control will now be described with reference to the flowchart shown in FIG. 26. In step 110, it is determined whether or not the vehicle speed V is less than the given vehicle speed V0. If the vehicle speed V is less than the given vehicle speed V0, the program proceeds to step 111 to inhibit the change to the speed increase condition. Thereafter, the vehicle continues to run. In step 112, it is determined whether or not the vehicle speed V is greater than V1 which is greater than V0 and the lateral G is less than G0. If the answer in step 112 is YES, the program proceeds to step 113 to permit the change to the speed increase condition. The value G0 in step 112 is set to about 0.1 G. Further, the determination in step 112 is to determine whether or not the vehicle is running straight at a vehicle speed greater than V1.

While the present invention is applied to a four-wheel drive vehicle based on a FF vehicle in the above preferred embodiment, the control method of the present invention is also applicable to a vehicle such that the power from a driving power source such as an engine is directly transmitted to the rear wheels, that the transmission of the power to the right and left rear wheels can be controlled by a clutch or the like, and that the power can also be transmitted to the front wheels by a clutch or the like. Further, the vehicle may be of such a type that the rear wheels are normally increased in rotational speed.

What is claimed is:

1. A drive force control method for a four-wheel drive vehicle including a torque distributing mechanism capable of changing a drive force distribution ratio between front and rear wheels and a drive force distribution ratio between right and left front wheels or between right and left rear wheels, said drive force control method comprising the steps of:

detecting a lateral G to output a lateral G signal;
   increasing the drive force distribution ratio of said rear wheels to said front wheels according to an increase in absolute value of said lateral G signal; and
   increasing the drive force distribution ratio of a turning outer wheel to a turning inner wheel, said turning outer wheel being one of said right and left front wheels or one of said right and left rear wheels, according to an increase in absolute value of said lateral G signal;
   detecting an unstable condition of said vehicle; and
   increasing the drive force distribution ratio of said front wheels to said rear wheels and decreasing the drive force distribution ratio of said turning outer wheel to said turning inner wheel when the unstable condition of said vehicle is detected.

2. The drive force control method for a four-wheel drive vehicle according to claim 1, wherein:

said lateral G signal comprises a lateral G sensor signal;
   said drive force control method further comprising the steps of:
   calculating an estimated lateral G according to a steering angle and a vehicle speed; and
   correcting said lateral G sensor signal by said estimated lateral G.

3. The drive force control method for a four-wheel drive vehicle according to claim 1, wherein:

said unstable condition detecting step comprises the steps of:
   calculating a slip angle of the vehicle;
   calculating a slip angle threshold;
   obtaining a difference between the calculated slip angle and the calculated slip angle threshold; and
   determining that the vehicle is in said unstable condition if said difference is greater than a predetermined value.

4. The drive force control method for a four-wheel drive vehicle according to claim 3, wherein said slip angle threshold is calculated based on a vehicle speed and said lateral G signal.

* * * * *